United States Patent [19]

Ogawa et al.

[11] Patent Number: 5,070,492
[45] Date of Patent: Dec. 3, 1991

[54] SIGNAL DECODING APPARATUS AND METHOD

[75] Inventors: Masaharu Ogawa; Yoshiki Nakajima; Osamu Ito; Teruo Furukawa; Kyosuke Yoshimoto; Kunimaro Tanaka; Masafumi Ototake; Minoru Ozaki, all of Amagasaki, Japan

[73] Assignee: Mitsubishi Denki Kabushiki Kaisha, Tokyo, Japan

[21] Appl. No.: 317,197

[22] Filed: Feb. 28, 1989

[30] Foreign Application Priority Data

Mar. 3, 1988 [JP] Japan .................................. 63-50136
Mar. 3, 1988 [JP] Japan .................................. 63-50137
Mar. 3, 1988 [JP] Japan .................................. 63-50138
Mar. 3, 1988 [JP] Japan .................................. 63-50140

[51] Int. Cl.$^5$ .............................................. G11B 7/00
[52] U.S. Cl. ........................................ 369/47; 369/59
[58] Field of Search ................ 369/124, 59, 44.26, 369/109, 47

[56] References Cited

U.S. PATENT DOCUMENTS 4,907,215 3/1990 Sako et al. ............................ 369/59

OTHER PUBLICATIONS

Monen, M. J. "LD500 Optical Disk Design Overflow" in SPIE vol. 695 *Optical Mass Data Storage 2* (1986) pp. 112-115.
Millar, R. and Abate, C. "Servo and clock sampling in the Optimem 1000" in SPIE vol. 529 *Optical Mass Data Storage* (1985) pp. 140-144.
Furukawa, T.; Nakane, K.; Arai, R. and Oonishi, R. "Pit Phase Compensating Method for Sample Servo Optical Disc Drive" in IEEE Transactions on Magnetics vol. 25, No. 5, Sep. 1989, pp. 3542-3544.

*Primary Examiner*—Robert L. Richardson
*Attorney, Agent, or Firm*—Wolf, Greenfield & Sacks

[57] ABSTRACT

The present invention relates to apparatus and method for decoding a signal reproduced from an optical disc. The optical disc has a signal format for recording data from an original signal in a data area at the optical disc. The optical disc also has recorded thereon a clock signal having the same phase as the recorded data. During reproduction of the recorded signal from the optical disc, this clock signal is utilized to generate a delayed version of the reproduced data signal. This delayed signal is used to decode the reproduced data signal obtained from the optical disc, thereby enabling a phase shift of the reproduced clock signal to there produced data signal to be eliminated by circuit processing. During the recording on the data area of the optical disc, fixing data for setting phases of data reproducing recording clock and reproducing signal to optimum phases for decoding is recorded. A phase corrector is provided at the optical disc driving apparatus so as to delay the fixing data signal reproduced from the optical disc, whereby a phase shift between the reproduced data signal and the reproduced clock signal can be corrected to an optimum quantity and the data signal at a preformatted area of the optical disc can be reproduced without delay.

7 Claims, 17 Drawing Sheets

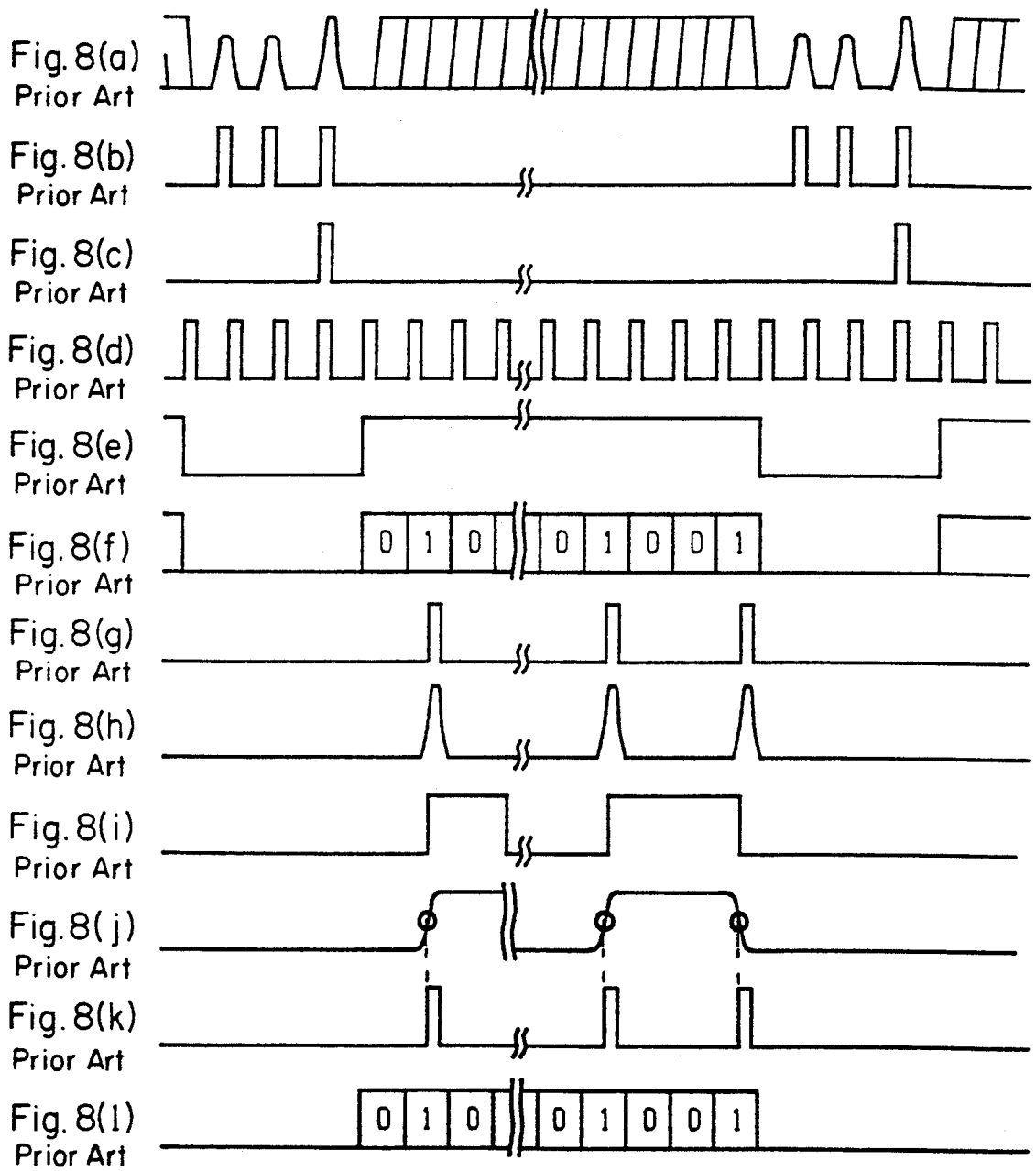

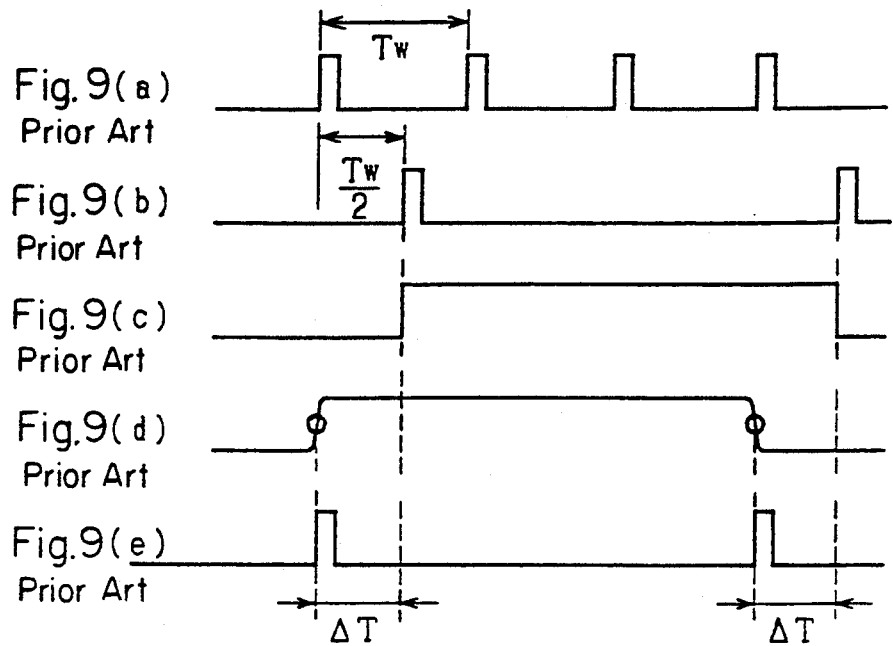
Fig. 9(a) Prior Art
Fig. 9(b) Prior Art
Fig. 9(c) Prior Art
Fig. 9(d) Prior Art
Fig. 9(e) Prior Art
Fig. 10
Prior Art
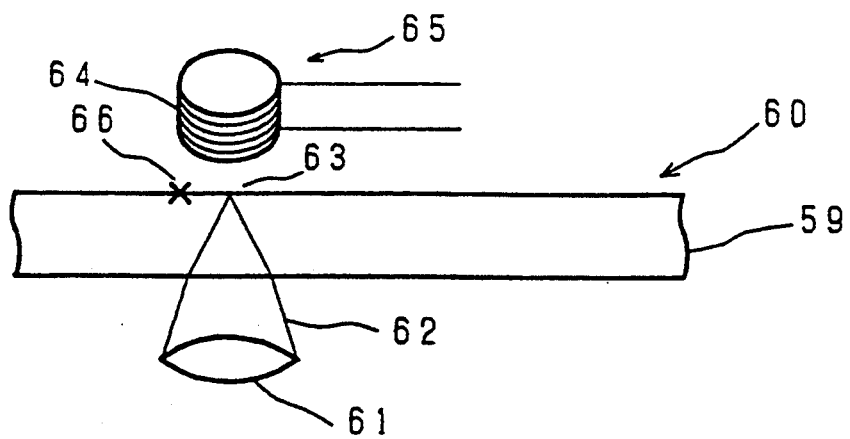

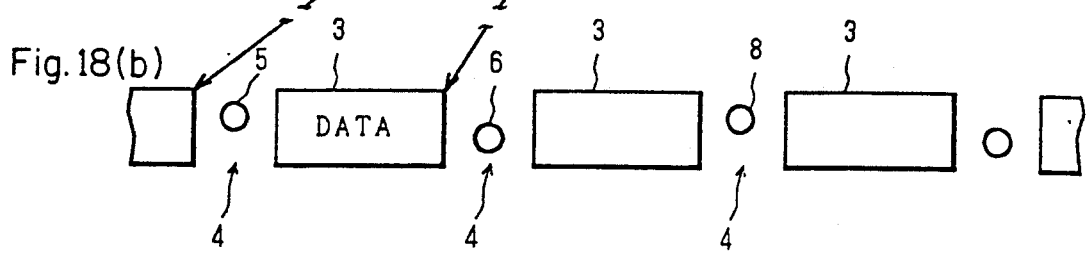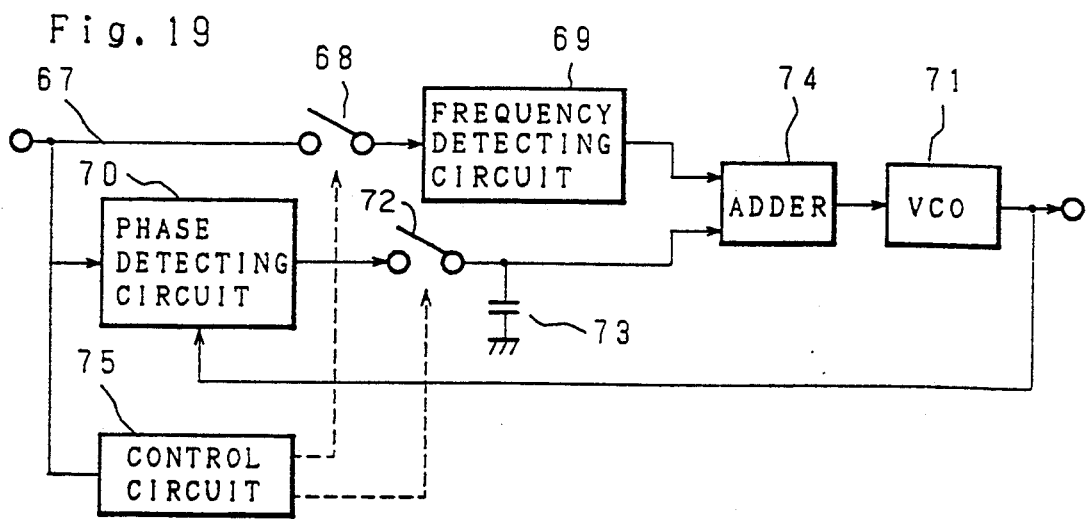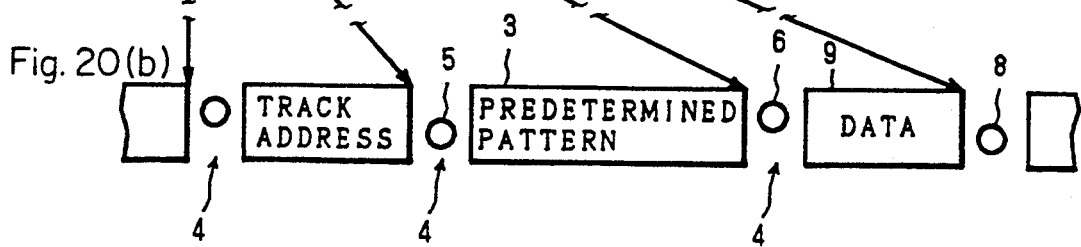

Fig. 21(a)
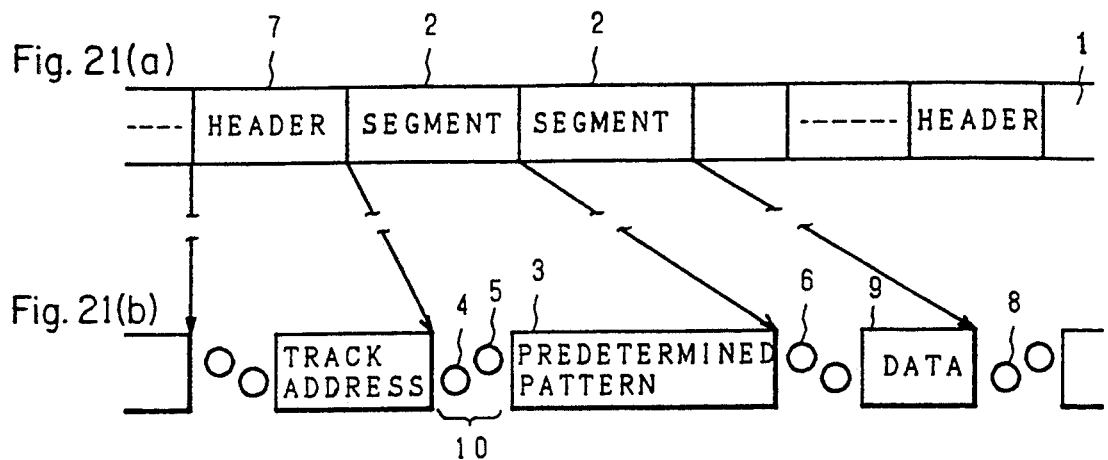
Fig. 21(b)
Fig. 22
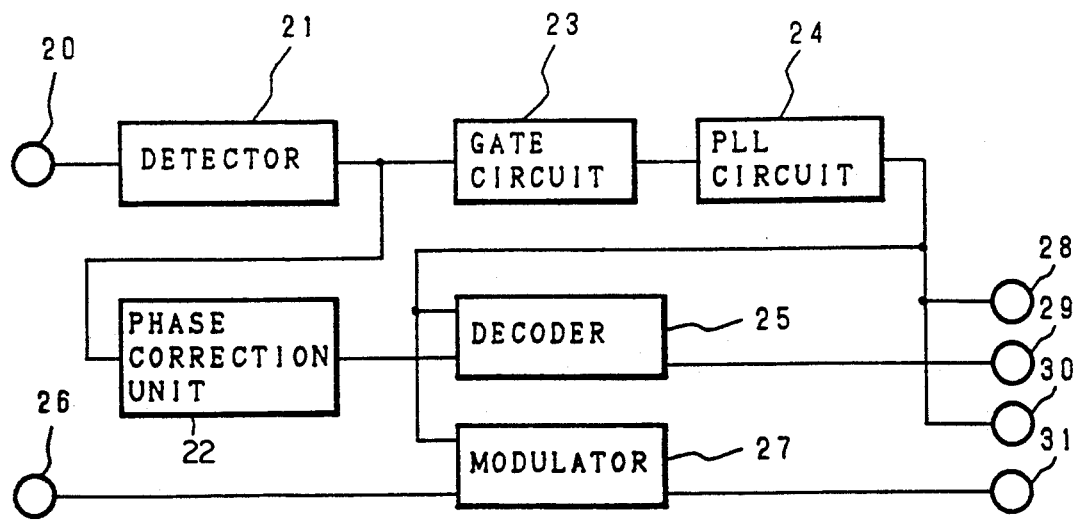

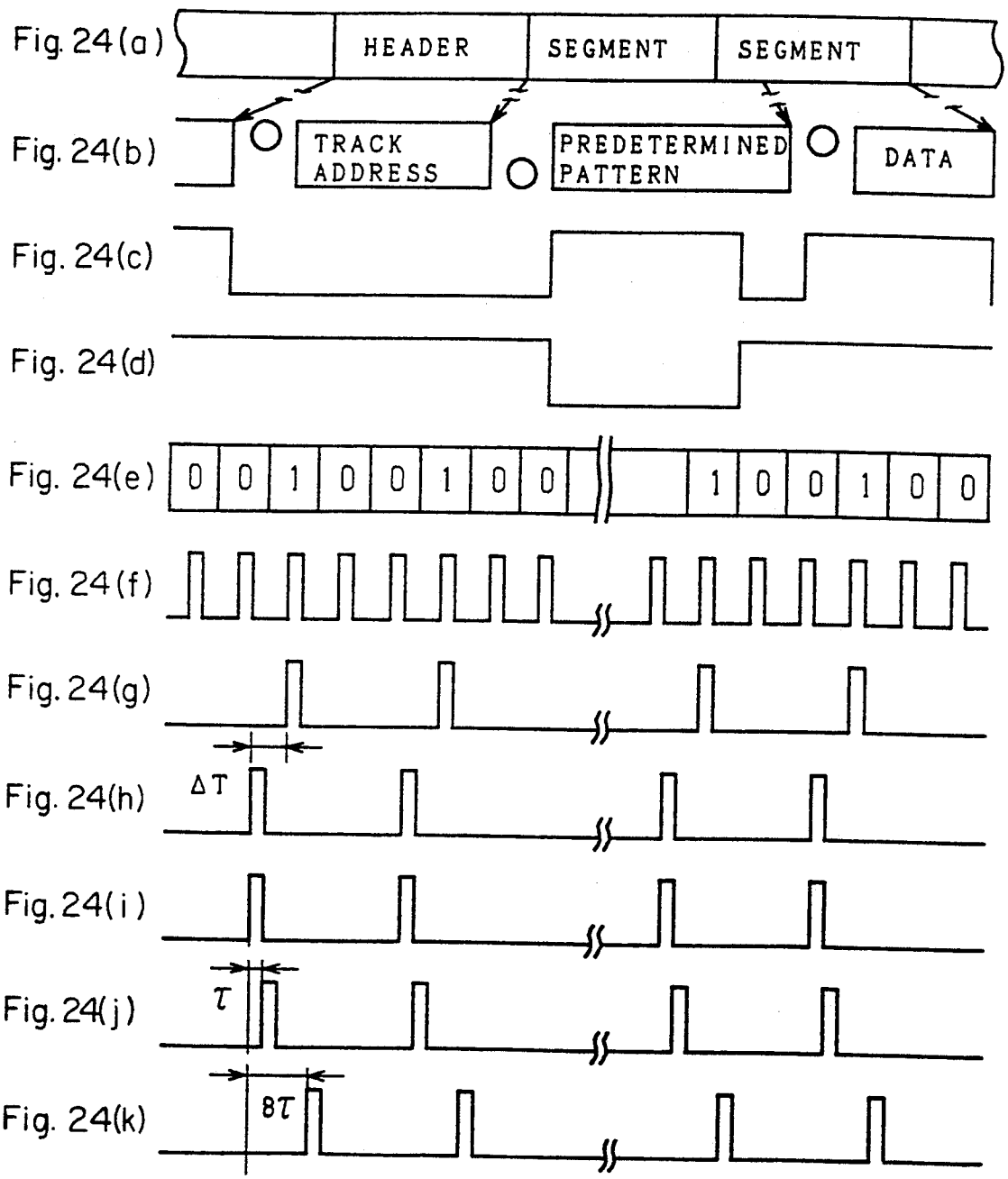

SIGNAL DECODING APPARATUS AND METHOD

BACKGROUND OF THE INVENTION

1. Field of the Invention

The present invention relates to an optical disc tracked by a sampled servo system and a driving apparatus for the optical disc, and more particularly to an improvement in a format of pits for sampled servo preformatted on the optical disc.

2. Description of the Prior Art

An optical disc has widely been used as a large capacity storage recordable in high density. The recording method by the optical disc is to record pits spirally or concentrically on a recording film of the optical disc by the laser beam restricted to about 1 μm in diameter. It is required for scanning the optical disc by the light beam in high density and recording pits to apply tracking servo and focus servo for coinciding the focus of light beam with the target position on a recording film. There are two methods for carrying out the tracking servo and focus servo. A first method is a continuous servo system using a guide groove and a second method a sampled servo system using wobbled pits.

FIG. 1 shows a track sector format of the optical disc of a conventional sampled servo system disclosed in, for example, SPIE, Vol. 695, Optical Mass Data Storage 2 (1986), Page 112. In FIG. 1, reference numeral 90 designates a sector construction of one circle of a track, each track comprising 32 sectors (labelled No. 0 to No. 31). Reference numeral 91 designates a segment construction of one sector, the one sector comprising 43 segments (B1 to B43). Each segment is composed of 18 bytes in total, including of a servo area of 2 bytes and a data area 16 bytes in continuation thereof. Each track is divided into 32×43=1376 segments.

FIG. 2 shows a pit pattern of the servo area. The pits 92, 94 and 93, 94 are slightly shifted reversely to the track centers 97 and 98, so that a tracking sensor signal is obtainable only from a pair of the pits (the pair is called wobbled pits). The principle of operation of such sampled servo system is described in, for example, SPIE, Vol. 529, Third International Conference on Optical Mass Data Storage (1985), Page 140. In such a conventional sampled servo system, since the tracking sensor signal can be obtained from pit pairs in the servo area, a guide groove for tracking is not required. Therefore, in order to have access at high speed to a target track from the present track, as shown in FIG. 2, servo area constructions A and B are alternately disposed at every 16 tracks so as to enable a moved track quantity to be counted.

In FIG. 2, track number is given in

Track Number = I + (N − 1) × 16, where I = 1, 2, 3, ..., 16. In the servo area construction A, N = 1, 3, 5 ... and in that B, N = 2, 4, 6 .... At the servo area constructions A and B, one pair of pits 92 and 93 are shifted in position in the direction of the track. During the access operation while the track is being traversed obliquely, the position of the pit is detected, thereby enabling the traversed track quantity to be obtained. This state will be explained in FIG. 3.

In FIG. 3, reference numeral 67 designates a large number of centers of the tracks, which are spaced from each other at intervals of 1.5 μm. Reference numeral 68 designates position of servo area. The servo area constructions A and B, as shown at the right-hand end in FIG. 3, are represented by A and B at every 16 tracks. Reference numeral 69 designates the locus of the light spot when it has access at high speed, a black point 70 representing the point where the light spot intersects the servo area, and the servo area construction being recognized at the point 70. The recognized signal waveform is shown by reference numeral 99. The high level shows the servo area, construction A and the low level shows servo area construction B. This means that sixteen tracks are counted at every change of state of the signal waveform 99. Thus the number of traverse tracks are countable from the signal waveforms 99 in access operation, resulting in that the light spot reaches the target track.

When reaching the target track, the tracking control using the reproducing signal for the wobbled pit pairs is carried out.

FIG. 4 shows a waveform of reproducing signals near the servo area, in which the reproducing signals 46 and 47 of the wobbled pits 92 and 94, the reproducing signal 48 of the clock pit 95 and the reproducing signal 49 of data are shown. FIG. 5 shows the principle for obtaining a tracking error signal for the tracking servo using the reproducing signals 46, 47 and 48. FIG. 5-(a) shows a reproducing signal when the light beam shifts leftwardly with respect to the track and performs the tracking, in which the reproducing signal 46 of the wobbled pit is reproduced large and the reproducing signal 47 of the wobbled pit is reproduced small. FIG. 5-(c) shows the waveform when the light beam is traced rightwardly of the track, the reproducing signal 47 being largely reproduced. FIG. 5-(b) shows the waveform when the light beam carries out tracking on the axis of track, in which the reproducing signals 46 and 47 are equally reproduced, the reproducing signal 48 of the clock pit being reproduced at a maximum. Accordingly, when a difference between the reproducing signals of both of the wobbled pits is taken, the tracking error signal is obtainable. FIG. 6 is a circuit diagram of tracking servo in the sampled servo system for performing the tracking servo by use of such signal, in which the signal shown in Flg. 4, read out from an optical head (not shown) and amplified by a preamplifier (not shown), is inputted to an input terminal 50. The input signal is switched by switches 51 and 52 and a maximum value of the reproducing signals 46 and 47 of wobbled pit is picked-up, and is held in capacitors 54 and 55. Switches 51 and 52 are driven by a clock circuit 53, so that the switch 51 is closed only at the point of time when the maximum value of reproducing signal 46 of the wobbled pit is developed and holds the maximum value in the capacitor 54, the switch 52 being closed similarly when the maximum value of reproducing signal 47 of the wobbled pit is developed. The clock circusit 53 is adapted to respond to the clock pulse 48 of input signal and operate in synchronism with rotation of the disc, thereby enabling the above-mentioned operation. A differential amplifier 56 produces a difference signal from voltages held by the capacitors 54 and 55, the difference signal being a tracking error signal. The tracking error signal is amplified by an amplifier 57 to drive an actuator 58 for the optical head. The actuator 58 carries thereon an objective lens (not shown), so that the tracking error signal drives the actuator 58 to move the objective lens so as to allow the light beam to trace the center line of track, thereby constituting the tracking servo system.

Next, explanation will be given on the data reproducing operation.

FIG. 7 is a block diagram of the conventional optical disc apparatus for forming the reproducing clock and data when the signal format in FIG. 2 is used. FIG. 8 illustrates the waveforms of the above. A photosensor current is I/V-converted and its reproducing voltage waveform (a) is inputted to a terminal 20 and then its pit tip is detected by a detector 21 to thereby obtain a detection signal (b). A gate circuit 23 utilizing characteristics between the clock pit and the wobbled pit and of that between the continued clock pits and detecting only the clock pit signal, is used to obtain a detected signal (c) from the detected signal (b). A phase-locked loop (PLL) circuit 24 produces a recording-reproducing clock (to be hereinafter called the rec-rep CK) (d) from the detected clock pit. Also, a switching signal (e) for a servo area and data area is obtained. The rec-rep CK is used to digitally modulate by a modulator 27 the recording data input to a terminal 26. The modulated clock and modulated data are reversely issued to terminals 30 and 31, and a laser recording amplifier records them when only the switching signal of data area is obtained. The recording method includes an RZ recording system (recording waveform (g)) for recording in a fixed length pulse of bit of logical "1" at the modulation data (f) and an NRZI recording system (recording waveform (i) for inverting its polarity at bit of logical "1". Each reproducing waveform becomes Gaussian isolated reproducing waveform (h) and its level tip is differential-detected, thereby obtaining a detected signal (k). On the other hand, in the NRZI system, reproducing waveform (j) is two-value-level-sliced so that its edge information is the detected signal (k). The detected signal (k) is data-decoded by the rec-rep CK (d) and a decoder 25 outputs decoded clock (d) and decoded data 1 to terminals 28 and 29. As above-mentioned, at the sampled servo system optical disc, since the recording data are written and the reproducing data are detected by using the clock pit being preformatted of the rec-rep CK, the recording code does not require the self clock capacity, such as the conventional run-length-limited code, and also it is advantageous in that a clock shift problematical in the self clock is difficult to occur. Conversely, there is no self clock capacity because of the data area being divided by the servo byte. When the phases of reproduce detected signal and that of the rec-rep CK shift, there is no decoding allowance to cause a detection error. This phenomenon will be described in FIG. 9. In FIG. 9, (a) shows the rec-rep CK; (b), an RZ recorded signal; and (c), an NRZI recorded signal. The detected signal, when detected at the center of a decoding window Tw of the rec-rep CK, has a width of the detecting decoding window of ±Tw/2 and is most difficult to cause the detection error. Next, the detected signal of the optical disc will be considered. Conventionally, a punching write-once type optical disc has used the RZ recording system. When the recording power is normal, the recorded signal phase and reproduced signal phase are relatively difficult to cause a shift, so that the reproduce detected signal can be reproduced in normal phase, thereby enabling the reproduce detected signal can be reproduced in the substantially normal phase as shown in FIG. 9-(b). However, the laser power of optical disc changes in its current/power characteristic with respect to the temperature and a shift of power characteristic or a change in the power characteristic at the inner and outer peripheries of the disc cause a phase shift, which remarkably affects a rewritable type magneto-optical disc. During the magneto-optical recording, when the laser power is applied on the disc and the temperature exceeds the predetermined value (curie temperature) with respect to the polarity of magnetic field, a magnetic film is magnetized to the applied magnetic field polarity, so that the rotation of disc after the stop of power application allows the magnetized polarity to remain when the disc is cooled under the curie temperature. Therefore, the residual magnetization pattern delays with respect to the applying power so that, when reproduced, the phase of reproduce detected signal leads with respect to the rec-rep CK.

In order to reduce the latency by the erase and recording mode recently required for the conventional magneto-optical disc, the system of magneto-optical disc having an immediate overwrite function has been proposed. The highest realizable system is a magnetic field modulation overwrite system, which uses the laser power as the DC recording power during the recording and changes the magnetic field polarity by a recording modulation signal, thereby performing the erasing and recording in the same mode. This system eliminates the defect in the optical disc to enable the overwrite with respect to the magnetic disc. At this time, the NRZI recording system carries out the magnetic field modulation so as to be realizable of largely improving the recording density. The reason for this is that when the minimum pit length can be recorded at the same width, the recording density at the NRZI recording is improved two times larger with respect to the RZ recording. However, it is reported that when the magnetic field modulation system is adopted to the sampled servo type optical disc, phase with respect to recording-reproducing of the reproduce detected signal largely changes.

Citations

K. Yamada et al, "Optical Storage Technology and Application", SPIE Proceeding Vol. 899-24, 12-15, Jan. 1988

At this time, the reproduced signal is as shown in FIG. 9(d) with respect to the phase of rec-rep CK, and its detected signal (e) leads by $\Delta T$ with respect to the phase of recorded signal, a value of $\Delta T$ is very large with respect to a window width of rec-rep CK, whereby at the sampled servo type optical disc, whereby it is difficult to perform the recording and reproducing of data.

The aforesaid conventional optical disc and optical disc apparatus have the following problems:

A synchronous pattern used for lead-in of the PLL must be distinguished from the data pattern, usually a long area being required, but since the conventional optical disc disposes the wobbled pits and synchronous patterns in the same position, a large capacity is required as a whole to thereby relatively reduce the gross capacity usable by a user.

When the light spot traverses the track at high speed, the direction of traversing the track cannot be detected.

When the light spot traverses the track at high speed, the number of tracks can be detected only at every 16 tracks, whereby the resolving power is rough and an idle time for detection at the track traverse speed increases, so that the speed control system cannot widely be used because of being limited by the idle time.

In order to further strengthen the tracking servo, when the servo band is intended to enlarge, the conventional wobbled pit gaps are impossible to be further enlarged. The band of PLL for generating the reproducing clock is somewhat insufficient, but the number of wobbled pits per one circle is predetermined, whereby it is impossible to further increase it. Meanwhile, in order to solve such problem, when the number of wobbled pits per one circle is increased, each servo area consumes every 2 bytes, thereby creating the problem in that the signal efficiency lowers as the number of servo areas increases.

For the prior art, the clock for reproducing the data has been obtained from the reproduced signal of the clock pit. Hence, the modulation code of data is not required to be of the selfclock system, but the degree of freedom is developed in selection of modulation code. On the contrary, for example, when the selfclock is desired, the servo area is too larger in length, thereby creating the problem in that the phase of PLL for generating the clock for data becomes not-stable while the servo area is being reproduced. Referring to FIG. 10, the above example is explained, in which the overwrite recording by magnetic modulation is shown. In FIG. 10, reference numeral 59 designates an optical disc when viewed in section which forms thereon a recording film 60. The laser beam 62 is irradiated through an objective lens 61 at the optical head to focus on a spot 63 on the recording film 60. The optical disc 59, when rotated, is heated at a temperature over the curie temperature point only at a portion struck by the laser beam 62. At the reverse side of the optical disc 59 with respect to the objective lens 61 is provided with an exciting coil 64, in which a signal current 65 flows according to the recording data. In a case of recording by the magnetic field modulation system, the laser beam is kept irradiated at constant intensity and the polarity of signal current 65 is switched following the data. Then, the recording film once heated over the curie point can be magnetized in the direction of the external magnetic field when the film is again cooled. Since it takes some time to cool the heated film, assuming that the film cools under the curie point when it reaches the point 66, in consideration of a certain point on the recording film, the film, at the point of time when it reaches the point 66 after once heated, is magnetized in the direction of the polarity of external magnetization. However, since the cooling speed is affected by the external temperature, the point 66 shifts circumferentially according to the temperature. Accordingly, during the reproducing, when the reproducing clock generated by the clock pit is intended to demodulate the data, the jitter increases to reduce an allowance for demodulation. On the other hand, when the modulation code of self clock is used, the above problem is to be solved, but the servo area in the prior art is too large in length, thereby creating the problem in that the phase of PLL for reproducing clocks is not-stable at the servo area.

The signal format of the optical disc of the conventional sampled servo system, as above-mentioned, is constructed to use the rec-rep CK and decodes the reproduce detected signal, whereby a phase shift thereof to the rec-rep CK cannot be corrected. Especially, the magnetic field modulation overwrite recording system generates a detection error by the phase shift, whereby it is impossible to allow the optical disc to have the high speed data recording-reproducing function in the same way as a magnetic disc.

SUMMARY OF THE INVENTION

In order to solve the above problems, the present invention has been designed. A first object thereof is to provide an optical disc and an optical disc driving apparatus which preformats in a data area of the head segment a track discrimination pattern different in its pattern at every one or plural tracks so that a required servo area is smaller in capacity, the traverse direction when the light spot traverses the track at high speed is detectable, the detection resolving power for the number of track traverse is improvable, and a detection dead time of the track traverse speed is reducible.

A second object of the present invention is to provide an optical disc which constitutes a sector of continued segments of one set of a servo area of 0.5 bytes and a data area of 4 bytes so that a band for the tracking servo and clock reproducing can be increased without lowering the signal efficiency and which reduces the servo area in length to have a recording format usable even for self clock modulation codes.

A third object of the present invention is to provide an optical disc and a reproduced signal decoding method, which optical disc has a signal format which records a predetermined data in a data area at the optical disc during the recording and generates a delay signal from a reproduced signal of the predetermined data during the reproducing so as to decode by the delay signal the reproduced signal of data, thereby enabling a phase shift of a recording-reproducing clock to the reproduced signal to be eliminated by circuit processing.

The above and further objects and features of the invention will more fully be apparent from the following detailed description with accompanying drawings.

BRIEF DESCRIPTION OF THE DRAWINGS

FIG. 10 shows the principle of overwrite recording of the conventional magnetic field modulation system, FIG. 19 is a block diagram exemplary of a clock reproducing circuit in the third invention, FIGS. 20(a) and (b) show recording formats of an embodiment of an optical disc in a fourth invention, FIGS. 21(a) and (b) show formats of a modified embodiment of the fourth invention, FIG. 22 is a block diagram of a recording-reproducing data formation circuit using a method in a fifth invention.

DESCRIPTION OF THE PREFERRED EMBODIMENTS

Figure 1:
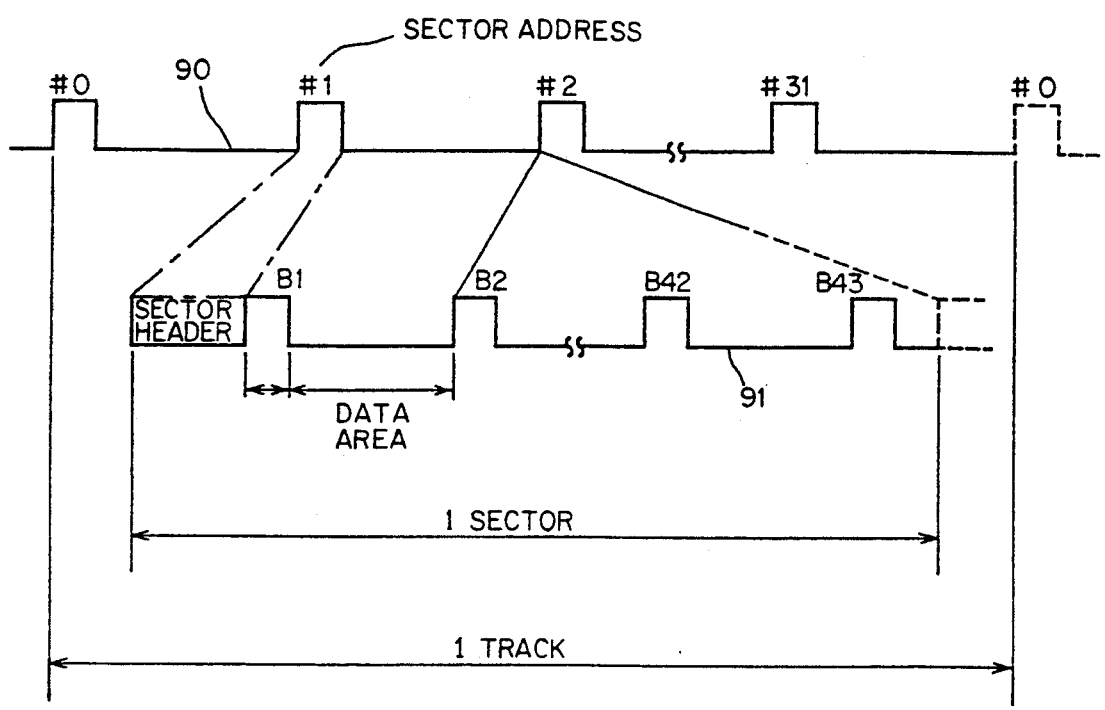
FIG. 1 is a format diagram of an optical disc of the conventional example.
Figure 2:
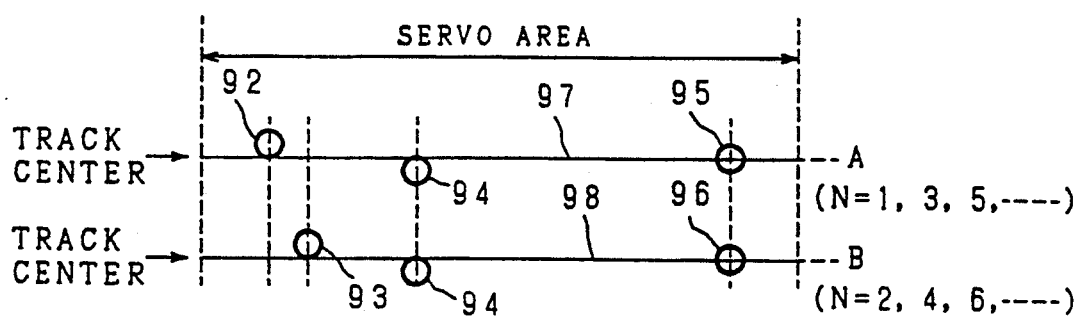
FIG. 2 shows pit patterns of a servo area shown in FIG. 1.
Figure 3:
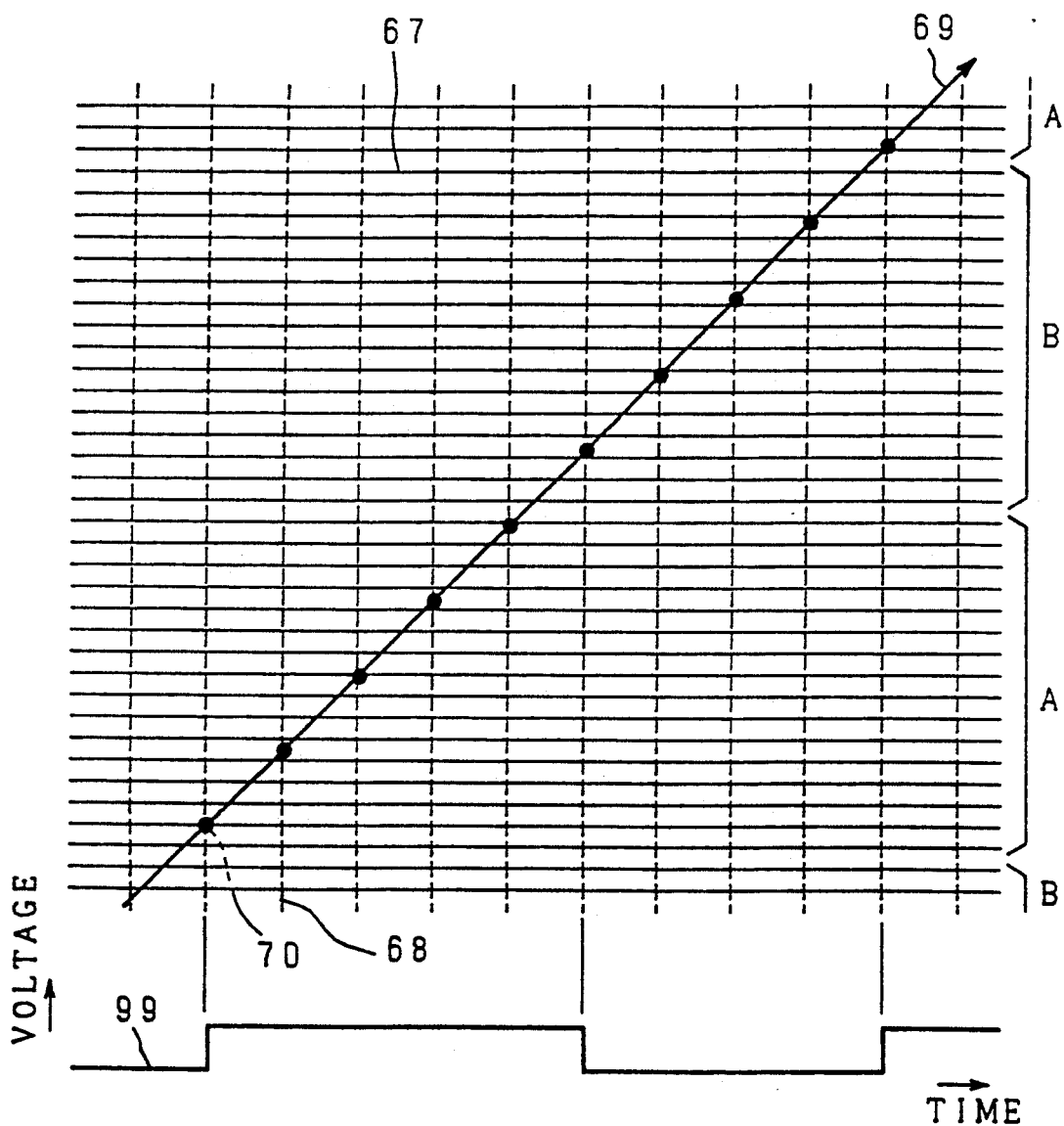
FIG. 3 is an illustration of track traverse operation.
Figure 4:
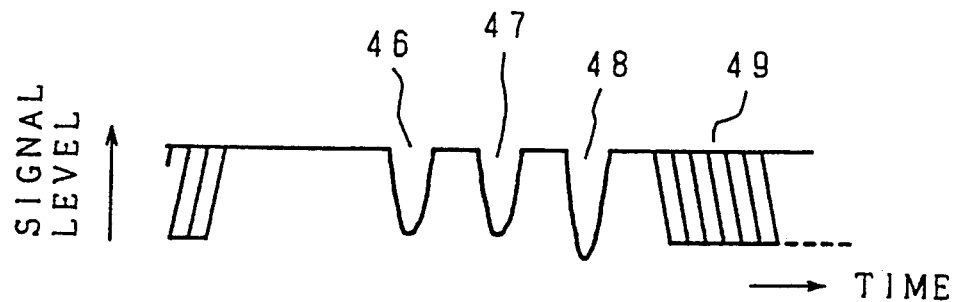
FIG. 4 is a waveform chart showing waveforms of a reproducing signal in the vicinity of a servo area.
Figure 11:
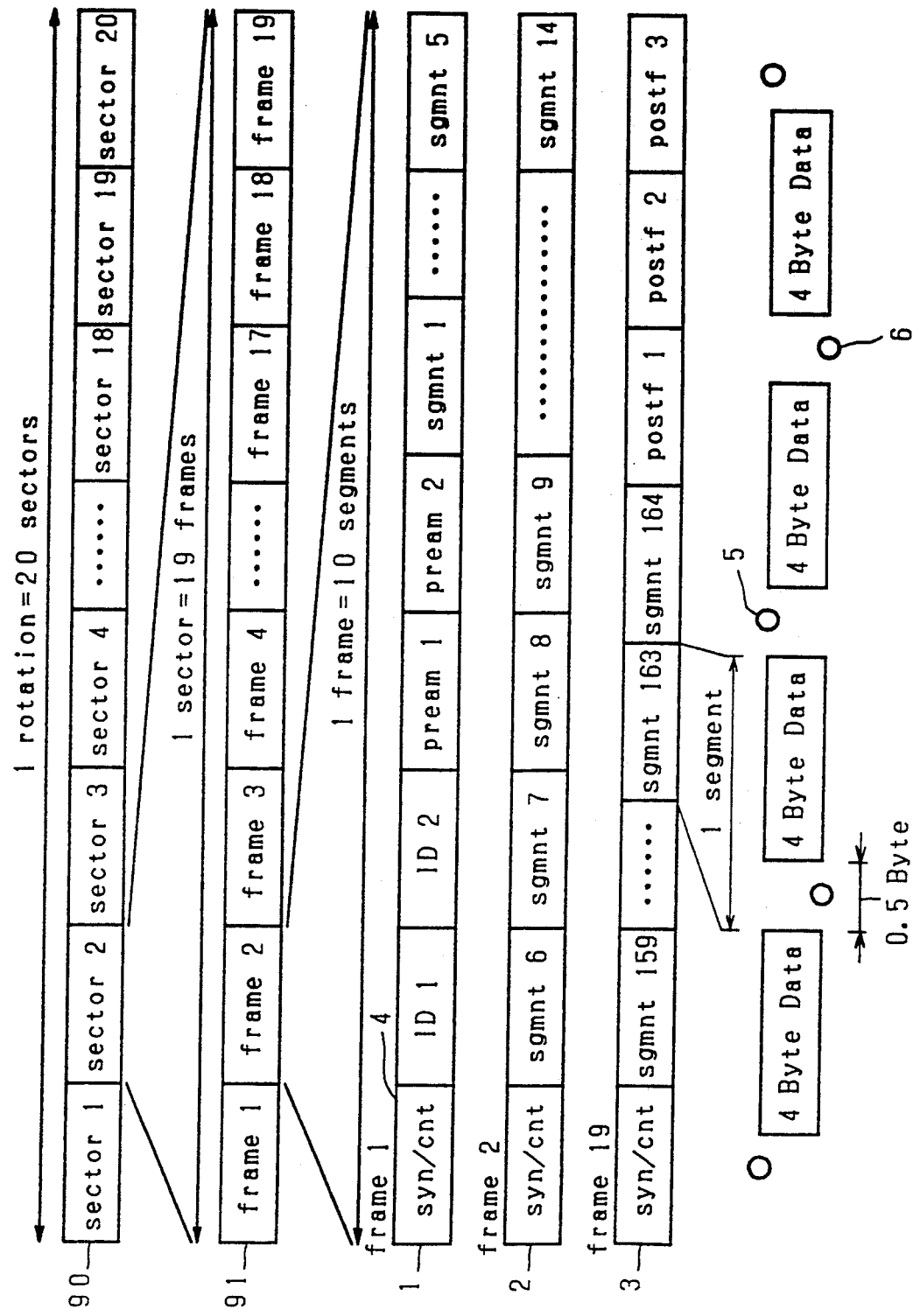
FIG. 11 shows a disc format of an embodiment of an optical disc of a first invention.

FIG. 11 shows a format of an embodiment of an optical disc of the first invention. In FIG. 11, the same components as those in FIG. 1 are designated by the same reference numerals. Reference numeral 90 designates constructions of selectors per one rotation of a track, which comprises 20 selectors, 91 designates constructions of frames per one selector, which comprises 19 frames, and 1 through 3 designate constructions of frames 1 through 3, one frame comprising 10 segments. One segment comprises a servo area of 0.5 byte and a data area of 4 bytes. At the servo area is preformatted a wobbled pit 5 or 6, which is formed symmetrically with respect to the center of track and a pair of wobbled pits 5 and 6 generate a tracking error signal. The head segment at the frame is a synchronous discrimination area 4 and at its data area are preformatted a synchronous phase pit and the track discrimination information.

Figure 12:
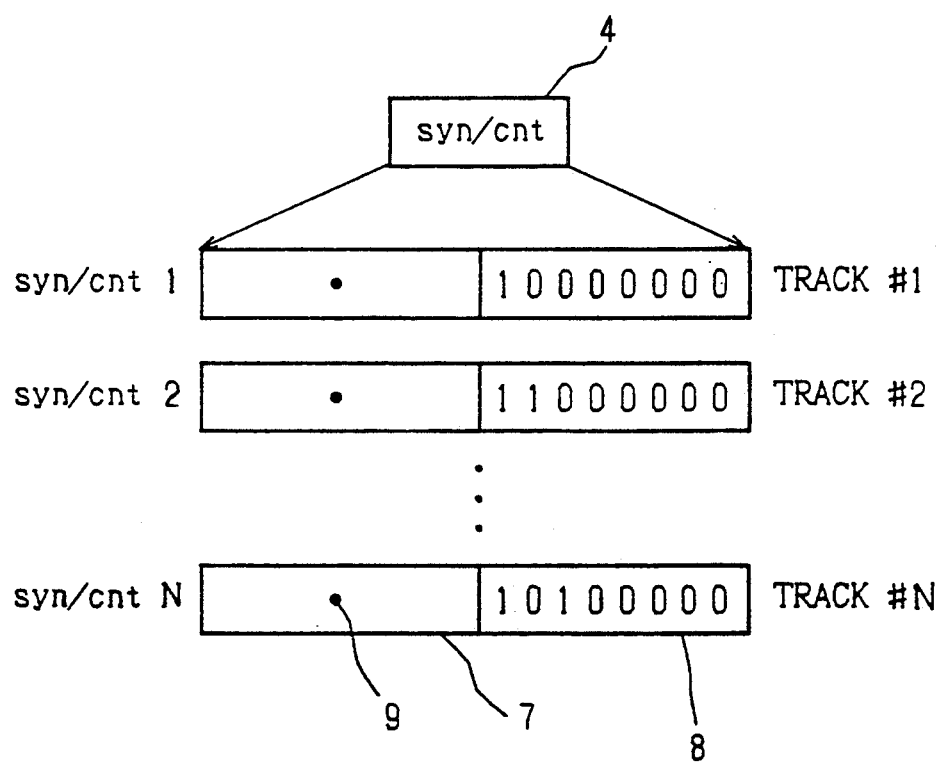
FIG. 12 shows a format of a synchronous and discrimination area of a part of the format shown in FIG. 11.

FIG. 12 shows a format exemplary of the synchronous discrimination area characterized by the first invention, in which reference numeral 7 designates a synchronous area, at the center of which is preformatted a synchronous phase pit 9. A track discrimination area 8 adjacent to the synchronous area is formed and a pattern different at every track is preformatted in the area 8.

Figure 13:
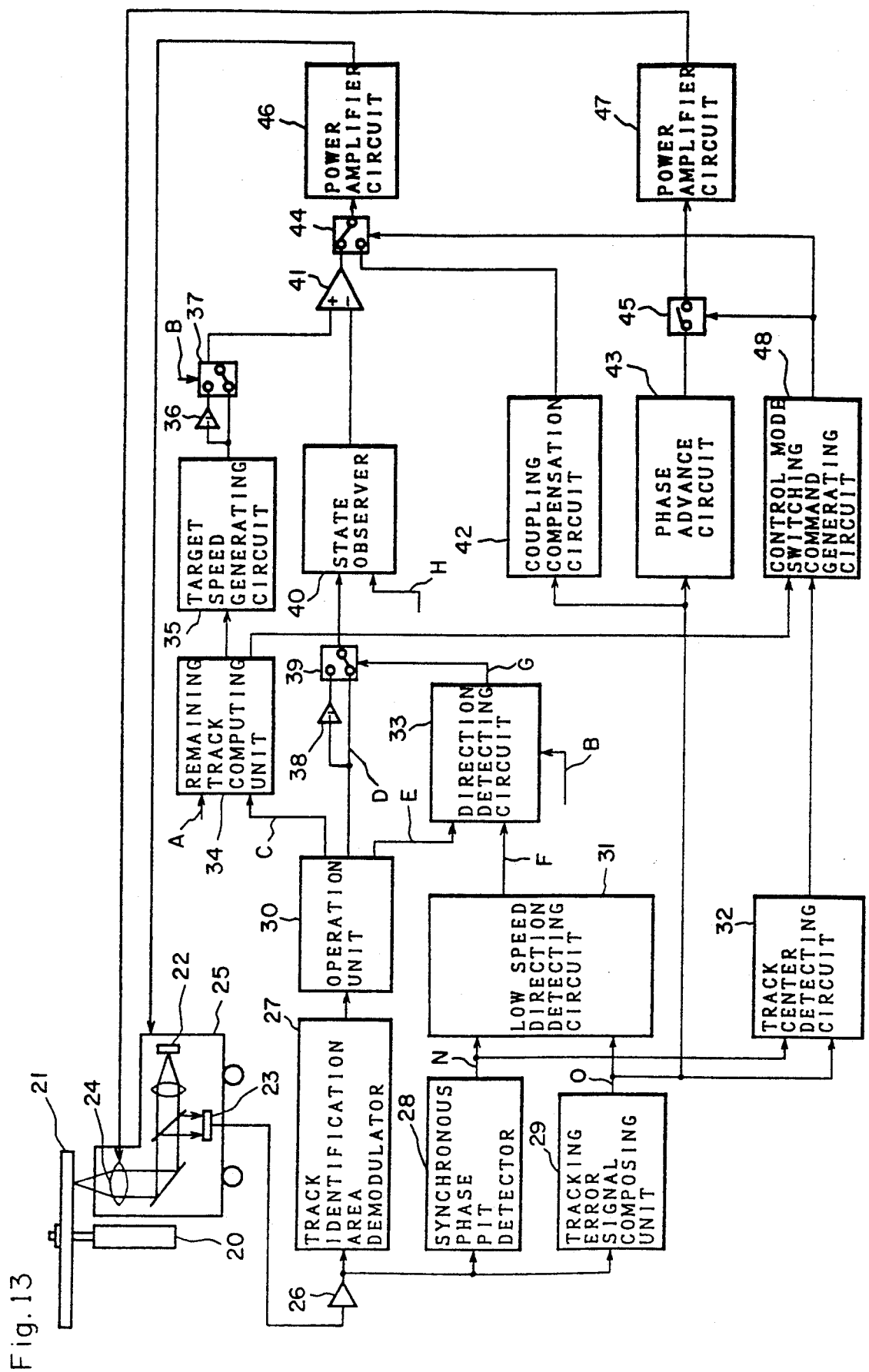
FIG. 13 is a block diagram of an optical disc driving apparatus of a second invention which uses the optical disc shown in FIG. 11 to realize high speed access.

FIG. 13 is a block diagram showing the construction of an optical disc driving apparatus of the second invention which uses the optical disc shown in FIG. 11 to realize access at high speed. In FIG. 13, reference numeral 21 designates an optical disc, which is supported by a disc motor 20 for rotating the disc 21. An optical head 25 movable radially on the optical disc 21 by a head actuator faces the lower surface of optical disc 21. The optical head 25 is provided with a laser diode 22 as a light source, an objective lens 24 which converges the laser beam as the light spot of a predetermined diameter from the diode 22 onto the optical disc 21, and a photodetector 23 for detecting the reflected light from the optical disc 21 to convert it into an electric signal.

The electric signal from the photodetector 23 is amplified by a preamplifier 26, the amplified signal being given to a track identification area demodulator 27 detecting a pattern of the track identification area 8 to decode, a synchronous phase pit detector 28 for detecting the synchronous phase pit 9, and a tracking error signal composing unit 29 which detects the wobbled pits and outputs the tracking error signal. The pattern signal demodulated by the track identification area demodulator 27 is given to an operation unit 30 outputting a track traverse number signal C, a track traverse speed signal D, and a track traverse direction signal E when the light spot traverses the track at high speed. A reflected light quantity signal N from the synchronous phase pit detector 28 and the tracking error signal O from the tracking error signal composing unit 29 are given to a low speed direction detector circuit 31 outputting a low speed traverse direction signal F and to a track center detector circuit 32 for detecting the center of the track respectively when the light spot traverses the track at low speed, the tracking error signal O also being given to a coupling compensation circuit 42 for picking-up the low frequency component in the tracking error signal O and to a phase advance circuit 43. The track traverse number signal C from the operation unit 30 is given to a remaining track computing unit 34 for computing the number of residual tracks with respect to a target track, the track traverse speed signal D is separately given to two input terminals at a switching circuit 39 directly or through an inversion amplifier 38, and the traverse direction signal E together with a low speed traverse direction signal F and a seek direction command B is given to a direction detecting unit 33 for deciding the traverse direction of the light spot. A track traverse direction signal G outputted from the direction detecting circuit 33 is given to a switching terminal at the switching circuit 39, thereby switching the polarity of the traverse speed signal D.

The number of residual tracks together with the track center is given to a control mode switching command generating circuit 48 outputting a command for switching to a tracking control mode from a speed control mode and a target speed generating circuit 35 outputting the target moving speed of the optical head 25. The outputted target moving speed is given separately to two input terminals at a switching circuit 37 directly and through the inversion amplifier 36. The switching circuit 37 switches the polarity of target moving speed by the seek direction command B and gives it to the positive input terminal at a differential amplifier 41. The traverse speed signal D from the switching circuit 39 together with a driving current H for the optical head 25 is given to a state observer 40 for assuming a more accurate track traverse speed than the above and then the assumed speed is given to the negative input terminal at the differential amplifier 41.

An output signal therefrom is given to one input terminal at a switching circuit 44 switched by the control mode switching instruction, the low frequency component of the tracking error signal O from the coupling compensation circuit 42 being given to the other input terminals. An output signal from the switching circuit 44 is given to the head actuator through an electric power amplifier 46 to drive the head actuator. An output signal of the phase advance compensation circuit 43 is given to a power amplifier circuit 47 through a switching circuit turned on-off corresponding to the control mode switching command, whereby an output signal from the power amplifier circuit 47 drives an actuator for the objective lens 24.

Figure 14:
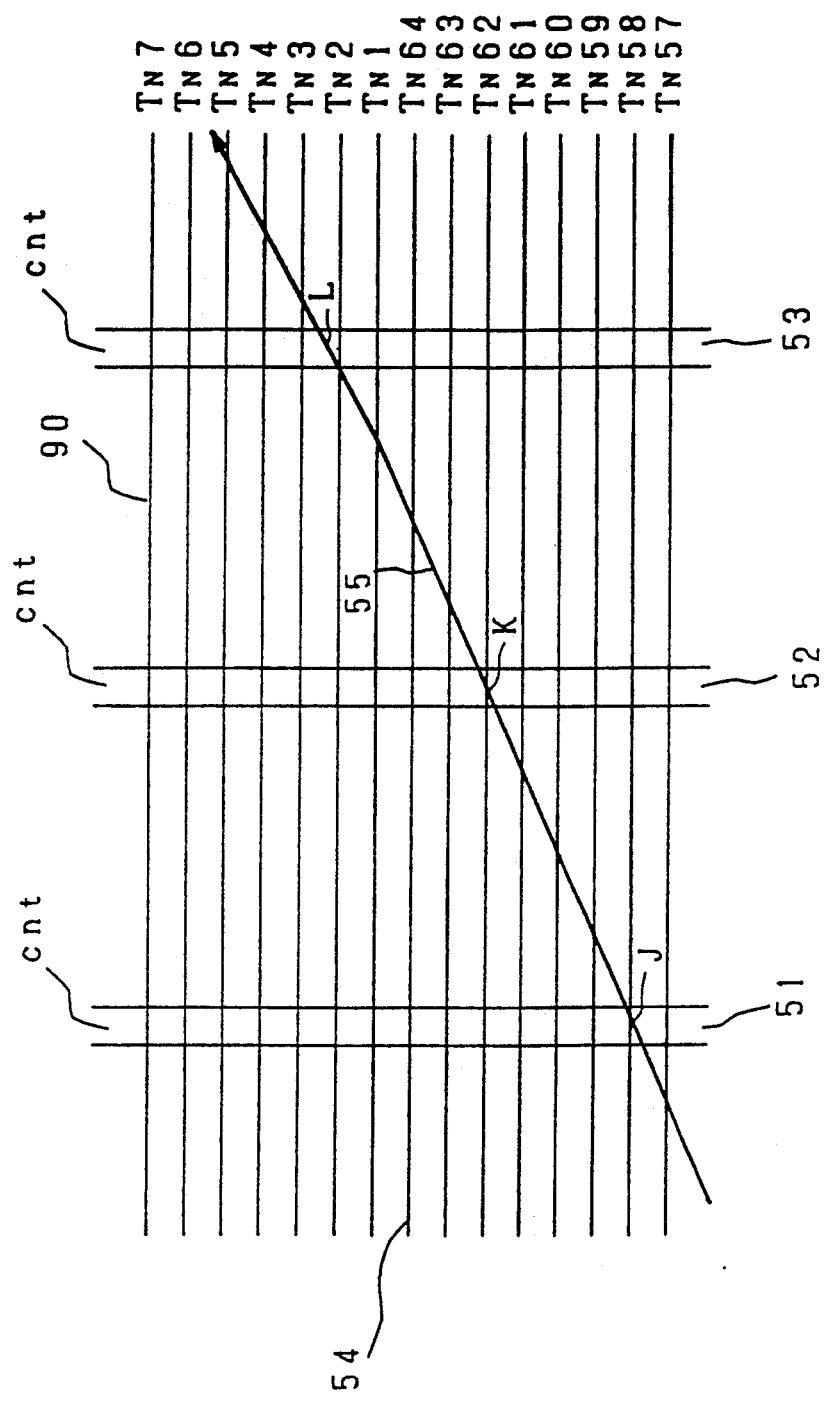
FIGS. 14 and 15 are illustrations of track traverse of the optical spot.

FIG. 14 is an illustration of mode of traversing of the light spot at high speed on the track identification area, in which reference numerals 51 through 53 designate track identification areas, 54 designates the track, and 55 designates the locus of the light spot.

Figure 15:
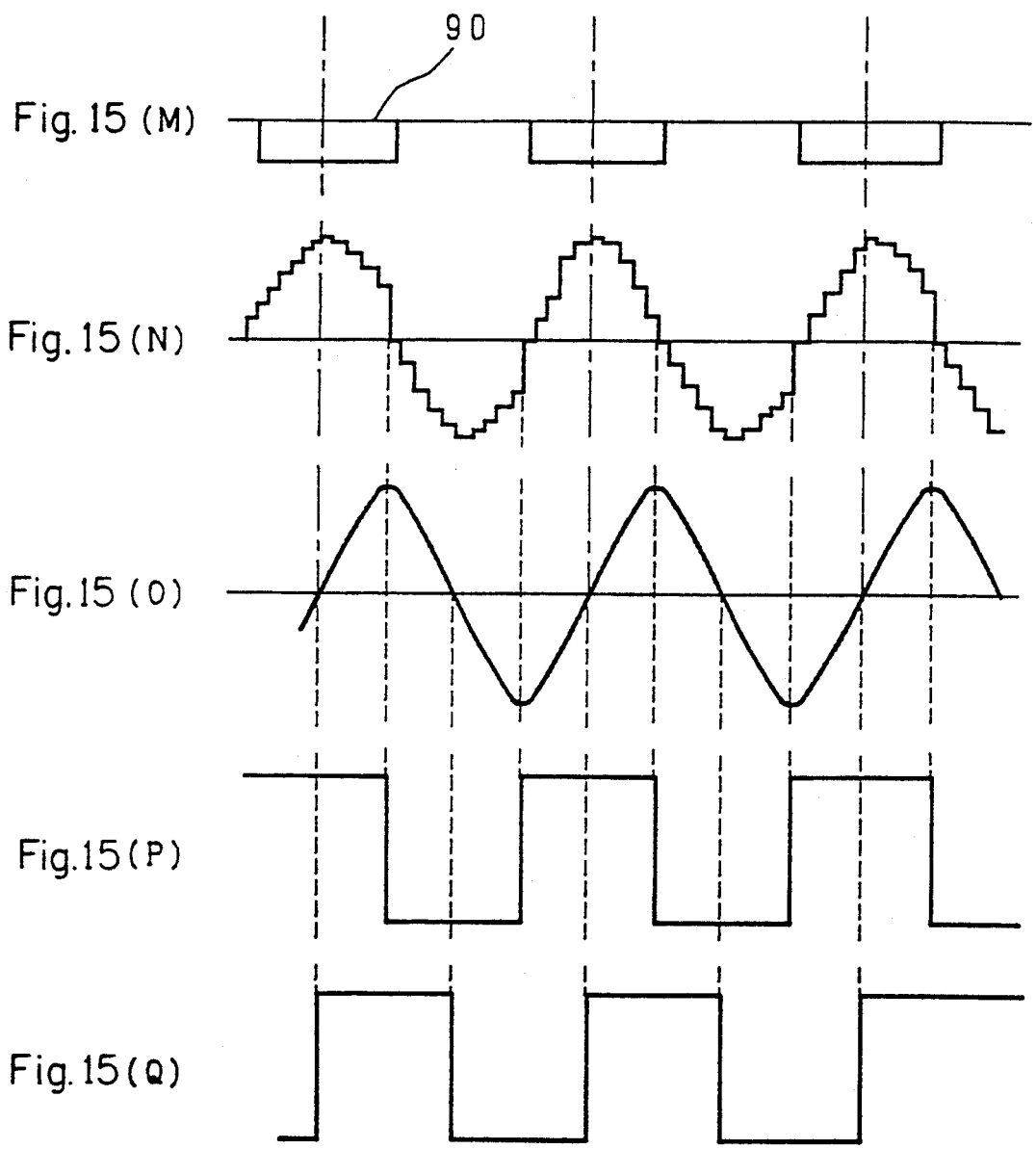

A mode of the light spot traversing the track identification area at low speed is shown in FIG. 15, in which reference letter M designates the disc in section, N designates a reflected light quantity signal, O designates the tracking error signal, P designates a logic signal comparing the reflected light quantity signal N, and Q designates a logic signal comparing the tracking error signal O.

Figure 16:
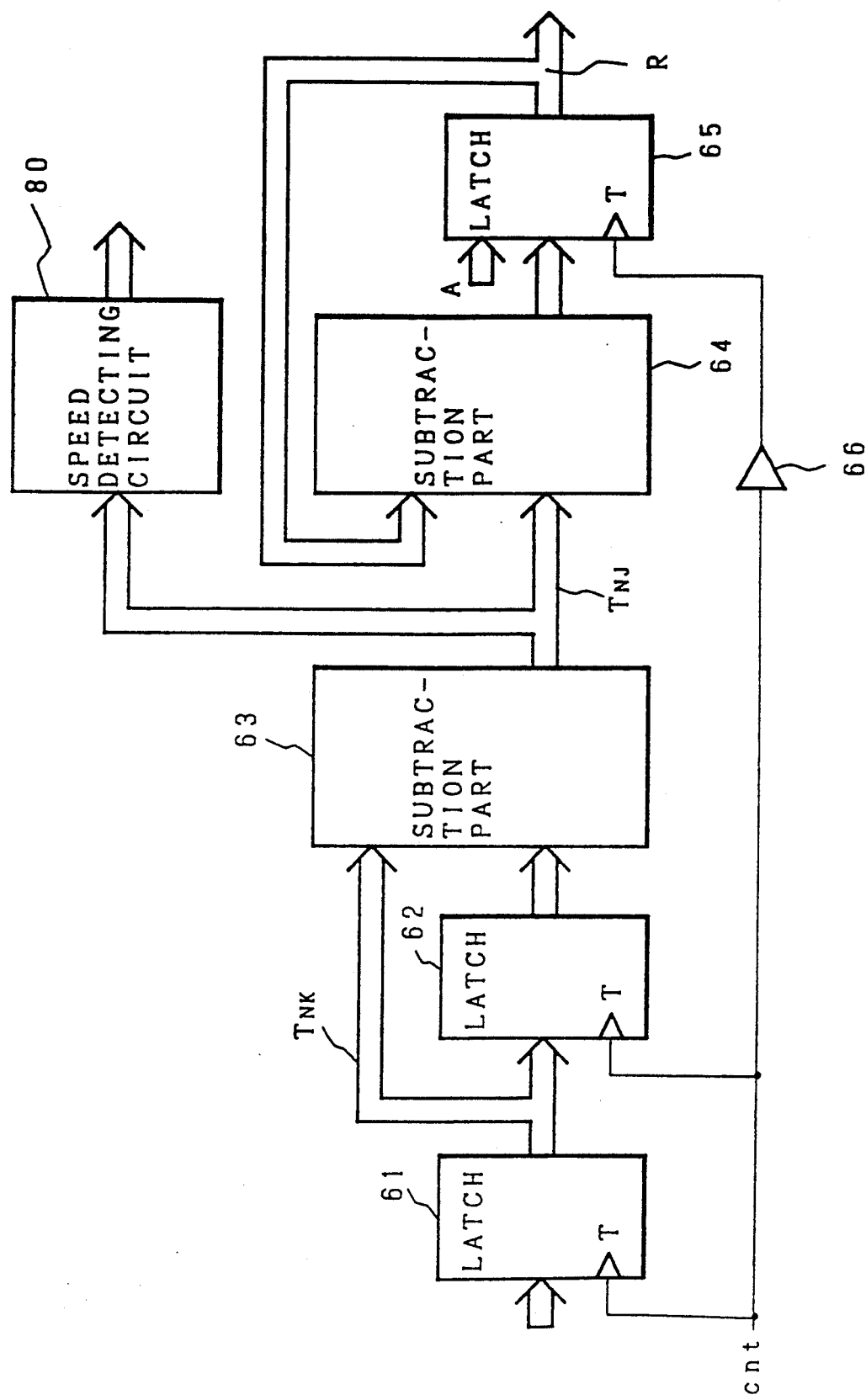
FIG. 16 is a block diagram in further detail of a computing unit and a residual track computing unit shown in FIG. 13.

FIG. 16 is a block diagram showing the construction further in detail of the operation unit 30 and remaining track number computing unit 34 shown in FIG. 13, in which reference numerals 61, 62 and 65 designate latch circuits, 63 and 64 designate subtractors respectively, 66 designates a delay element, and 80 designates a speed detecting circuit.

Next, explanation will be given on operation of the above-mentioned embodiment.

The wobbled pits 5 and 6 are assumed to be one pair so that the quantity of the reflected light therefrom is converted by the photodetector 23 into an electric signal and the signal amplified by the preamplifier 26 is held each time to take up each difference, thereby obtaining the tracking error signal of the off-track information shown in FIG. 15-(O). Since the same particular pattern not developed at the data area is prewritten in the synchronous area 7, the pattern is used for lead-in of PLL required to data signal extraction. After lead-in of PLL, it is possible to find the phase pit 9 disposed at the particular position on the disc, so that when the light spot slowly traverses the track, the photodetector 23 detects the total quantity of the reflected light from the synchronous phase pit 9, and the signal amplified by the preamplifier 26 is held each time, thereby obtaining the signal as shown in FIG. 15-(N). Since the tracking error signal (O) and reflected light quantity signal (N) has therebetween a phase difference of 90°, logic signals of comparative signals shown in FIGS. 15-(P) and -(Q) can detect the moving direction of the light spot by means of the well-known method often used for detecting the rotation direction of a rotary motor. Furthermore, when the timing is at the leading edge or the trailing edge of the comparative signal Q, whether the logic of comparative signal is at a level "H" or "L" is checked, so that if "H", the light spot is at the center of track.

When the light spot traverses the track at high speed and a track traverse cycle period at that time is less than the two-fold detecting cycle period of the synchronous phase pit 9, in turn the two-fold detecting cycle period of wobbled pits 5 and 6, the reflected light quantity signal (N) and tracking error signal (O) cannot already been detected due to the well-known sampling theorem. Accordingly, a signal different in pattern at every one track is prewritten in the track identification area 8 shown in FIG. 12, so that even when the light spot traverses the track at high speed, the number of track traverse, the traverse direction and the traverse speed are detectable. In other words, the pattern written in the identification area 8, if repeated, for example, at every 64 tracks, reads codes designated to the tracks when the light spot traverse the identification areas 51, 52 and 53, whereby it is detectable that where the spot is traversing among the bands of 64 tracks. In other words, the number of tracks traversed by the light spot while moving from the point J to that K is the absolute value of the difference between the track numbers TNJ and TNK read out by the respective identification areas, thereby enabling the traverse direction to be detected from the sign of difference. Also, since a time difference between the track identification areas 51 and 52 adjacent to each other is already known, when the number of traversed tracks is known, the traverse speed is detectable by dividing the above value by the time difference. For example, the Gray code, when used for the track identification area 8, is deemed to be any adjacent track even when the light spot traverses the center of the adjacent tracks like the point L, which is convenient.

In FIG. 13, the light issued from the laser diode 22 is reflected by the optical disc 21, photoelectrically converted by the photodetector 23, and amplified by the preamplifier 26. During the track seek, when the light spot traverses at high speed the track on the optical disc, from the identified number demodulated by the track identification area demodulator 27, the operation unit 30, as abovementioned, detects the number of track traverse C, traverse speed D and traverse direction E. The remaining track number computing unit 34 subtracts the track traverse number C from the preloaded number A of tracks to be traversed, and the target speed generated from the target speed generating circuit 35 on the basis of the residual track number outputted from the remaining track computing unit 34 is switched of the polarity by the switching circuit 37, thereby generating the target speed.

Figure 5A:
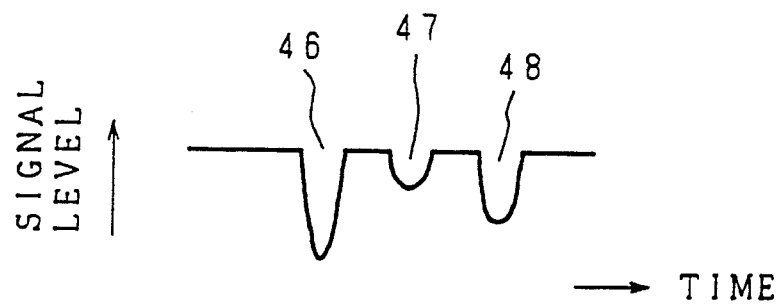
FIGS. 5(a)–5(c) are illustrations of the principle for obtaining a tracking error signal.
Figure 5B:
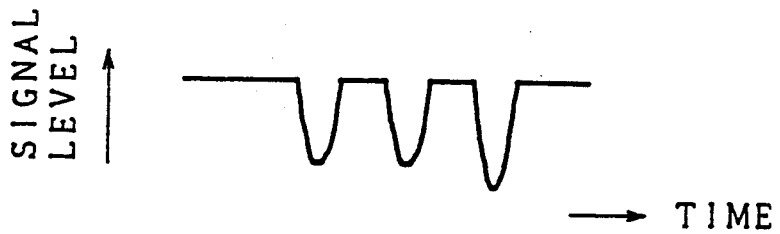
Figure 5C:
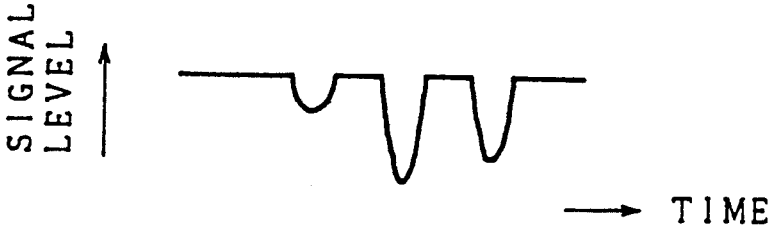

On the other hand, three kinds of directional signals of; the track traverse direction E at high speed, detected by the operation unit 30; the track traverse direction F at low speed, detected by the low speed direction detecting circuit 31 from the output signals N and O from the synchronous phase pit detector 28 and tracking error signal composing unit 29 through the method described in FIG. 5; and the seek direction command B; are switched by the direction detection circuit 33 in accordance with a track traverse speed signal D, thereby obtaining a track traverse direction signal G. The track traverse speed signal D is switched of its polarity by the switching circuit 39 on the basis of the track traverse direction signal G to be the track traverse speed signal. Furthermore, a state observer 40 also uses a head actuator driving current signal H to estimate a further accurate track traverse speed of optical disc. The differential amplifier 41 computes a difference between the target speed and the track traverse speed, the difference being transmitted to the head actuator 25 through the switching circuit 44 and power amplifier circuit 46. At the instant that the track traverse speed becomes low and the optical spot reaches the target track, the track center detecting circuit 32 detects the track center from the tracking error signal O and the control mode switching command generating circuit 48 outputs a switching command for the switching circuits 44 and 45 on the basis of the track center and the signal meaning the residual track number O outputted from the remaining track number computing unit 34, so that the speed control mode is transferred to the tracking control mode. In the tracking control mode, the tracking error signal O is transmitted to the lens actuator 24 through the phase advance compensation circuit 43, switching circuit 45 and power amplifier 47. Simultaneously, the low frequency component of the signal O is transmitted to the lens actuator 24 through the coupling compensation circuit 42, switching circuit 45 and power amplifier 47. Also, simultaneously, the low frequency component of the same is transmitted to the head actuator 25 through the coupling compensation circuit 42, the light spot following the center of track.

Referring to FIG. 16, the track identification number TNK detected at the point K shown in FIG. 14 is latched to the latch circuit 61, using the track identification area detected signal (cnt) as a trigger signal and the track identification number TNJ detected at the point of time ahead by 1 sample is latched to the latch circuit 62. The subtractor 63 computes TNJ-TNK. The value is subtracted by the subtractor 64 from the number of seek tracks (A) preloaded on the latch circuit 65 and the track identification area detected signal (cnt) is delayed only by a computing time to be required at the subtractor 63 through a delay element 66 and used as a trigger signal so as to again latch the value of TNJ-TNK to the latch circuit 65, thereby obtaining the number R of residual tracks. Meanwhile, the absolute value of TNJ-TNK computed by the subtractor 63 is divided by a time required from the point K to that J, thereby enabling the track traverse speed to be detected by a speed detecting circuit 80.

Figure 17:
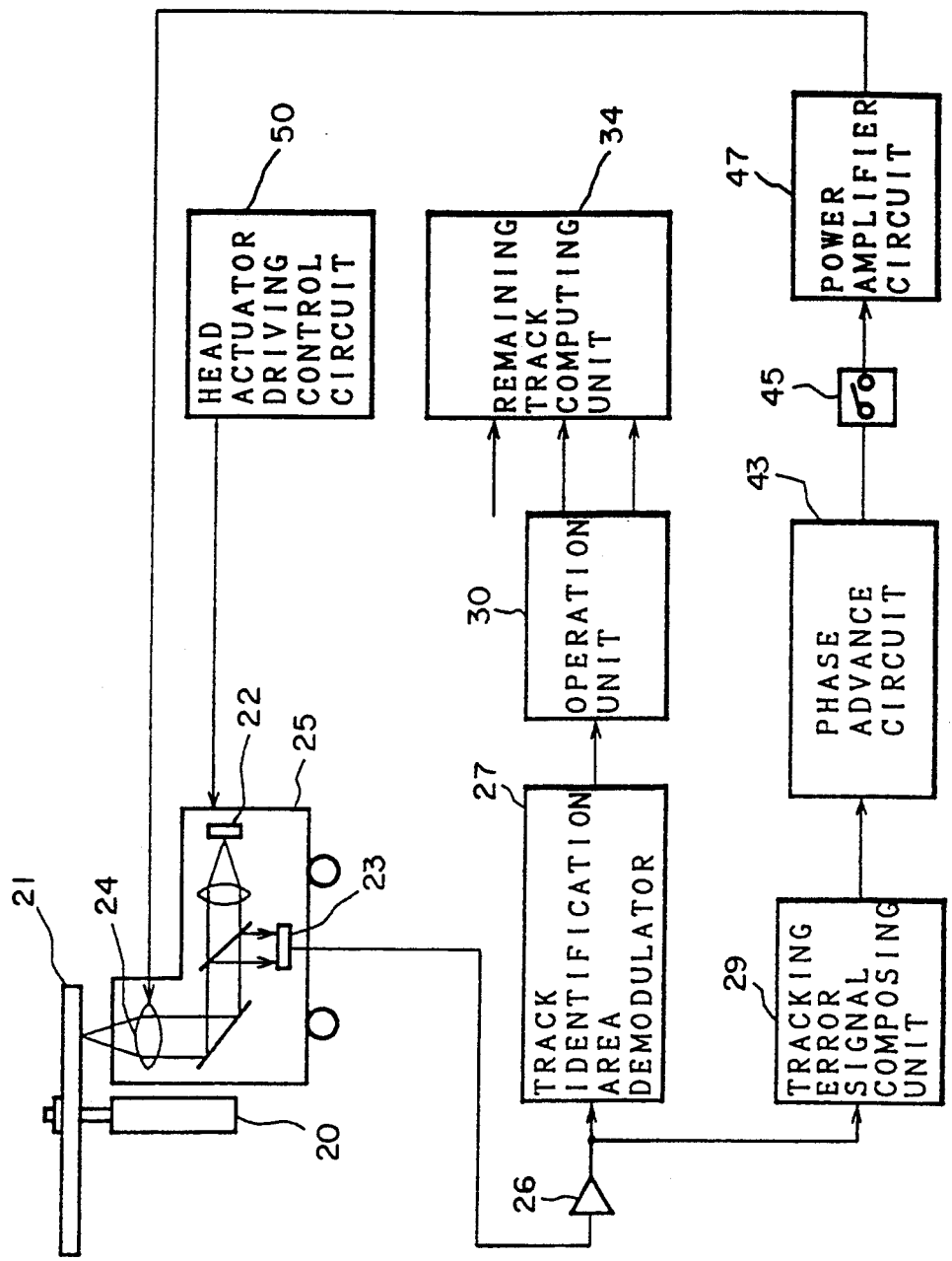
FIG. 17 is a block diagram of a modified embodiment of the optical disc driving apparatus in the second invention, FIGS. 18(a) and (b) show a format of an optical disc in a third invention.

A modified embodiment of the second invention is shown in FIG. 17, in which reference numerals 20 through 47 are the same as in FIG. 13, the explanation thereof will be omitted.

As shown in FIG. 17, the speed of the head actuator 25 need not be controlled by detecting the track traverse speed. Alternatively, a head actuator drive control circuit 50 may control the optical head regardless of the information written in the optical disc 21 and the switching circuit 45 may be turned on at the target track or in the vicinity thereof to be switched to the tracking mode.

In addition, in the embodiment shown in FIG. 13, the synchronous phase pit for detecting the reflected light quantity signal is disposed in the synchronous identification area 4, which need not be disposed especially in the same. It need only be disposed on the track center at the predetermined gaps and radially on the disc so that the pit can detect the signal at the predetermined gaps during the traversing the track of the light spot.

Alternatively, the number of synchronous phase pits may be equal to or more than the number of pairs of wobbled pits. In this case, the capacity usable by a user decreases, but it is possible to provide an optical disc driving apparatus capable of high speed access.

In the embodiment shown in FIG. 13, the track traverse direction is detected at low speed from the reflected light quantity signal N and tracking error signal O, which may be detected by the demodulation signal from the identification area also at low speed. The direction detecting circuit 33 does not use the low speed and high speed detected signals F and E, but may output the switching command signal for the switching circuit 39 only by the seek direction command B.

Furthermore, during the low speed driving, period of the reflected light quantity signal N or tracking error signal O is used to detect the track traverse speed, thereby enabling detection of speed with more accuracy.

The state observer 40 need not be used and the lens actuator may be used also as the head actuator.

As seen from the above, the first and second inventions dispose on the optical disc the synchronous phase pits for detecting the reflected light quantity signal less in number than the pairs of wobbled pits for detecting the tracking error signal, the servo area is reduced in result in a large data area usable by the user. Since a different pattern is depicted at every one or plural tracks in the identification area, when the light spot traverses the track, the track traverse direction, traverse number and traverse speed are detectable, whereby there is no need of using particular scale for speed detection for the optical head, whereby the optical disc apparatus can be small-sized and capable of high speed access.

Figure 6:
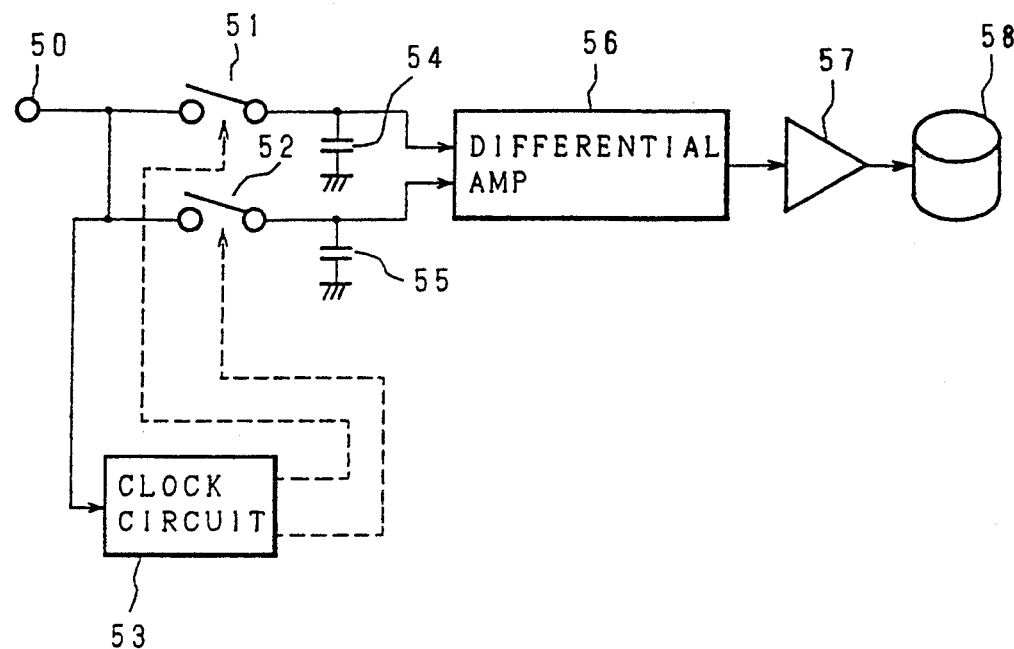
FIG. 6 is a block diagram showing the constitution of the conventional tracking servo circuit.

Next, an embodiment of the third invention will be described in accordance with the drawings. FIG. 18 shows an example of recording format of optical disc of the third invention, in which the data is recorded by sector construction in the same way as the conventional. In FIG. 18, reference 1 designates a data format in one track, which is partitioned into segments 2, 2 . . . each of 4.5 byte units, each segment comprising a data area 3 of 4 bytes and a servo area 4 of 0.5 byte for a wobbled pit. In the servo areas 4, 4 . . . wobbled pits 5, 6 and 8 are recorded respectively. The wobbled pits 5 and 8 shift by about ¼ of the size of pit leftwardly from the center of the track 1 when viewed from the forward direction of the light beam, and the wobbled pit 6 shifts by about ¼ of the size of pit rightwardly from the center of the track 1 when viewed in the same way as the above. The tracking servo of the present invention, as with the conventional example, can be performed by use of the circuit shown in FIG. 6. It is different from the conventional example only in that the time, when the switches 51 and 52 are closed, must be changed only to an extent of changing the position of the wobbled pits. In the conventional example, a new tracking error signal is obtained at every 16 bytes, but a new tracking error signal in the present invention is obtained at every 4 bytes, thereby enabling the zone of tracking servo to be increased four times. Reference numeral 7 designates a track address data portion in the track 1, which has a length of 4.5 bytes as same as the segment, and a servo area 4 and a data area 3 in its internal construction, which are entirely recorded with prepits, the data area 3 recording the code corresponding to the track address. Accordingly, the entire track addresses 7 in a certain track record the same codes. In the conventional example, the wobbled pit has the information of track address, but the method of the present invention is too small in the servo area 4, thereby newly providing the track address data portion 7 in the data. Accordingly, in a case of access control by the track computing system, the position of optical head can be decided by observing the track address data portion 7. The track address data portion 7 lowers in the data efficiency, but the number needful to one rotation of track address data portion 7 is at most 300 to 350. Now, when one circle is assumed to be 32 sectors, 6200 segments are disposable to thereby cause a loss of about 5%. However, when the pit length recording of self clock modulation code is carried out, the recording density can be increased more than 50% to thereby enable an increase in the recording density by the present invention.

FIG. 19 shows an example of a clock reproducing circuit of the third invention. A reproducing signal obtained by the optical head and preamplifier (not shown) is inputted to an input terminal 67. Reference numeral 68 designates a switch, which is closed only when the gap is reproduced so as to input the reproducing signal of a wobbled pit to a frequency detecting circuit 69. Accordingly, the circuit 69 responds only to the reproducing signal of the wobbled pit so as to output a voltage corresponding to the frequency of the wobbled pit. Reference numeral 70 designates a phase detecting circuit, which compares the phase of an output signal of a voltage controlled oscillator 71 with that of the inputted reproduced signal. A switch 72 is so controlled to be open when the servo area 4 is reproduced, a phase just before the servo area 4 is accumulated in a capacitor 73 while the switch 72 is open. Adder 74 adds the output of the phase detecting circuit 70 and that of the frequency detecting circuit 69 with moderate weight, the output of adder 74 being a phase error signal for controlling the voltage controlled oscillator 71 control circuit 75 detects the track address data portion from the reproducing signal, detects the phase of rotation of the disc, and synchronizes with the reproducing of the servo area, thereby controlling the switches 68 and 72. In a case where such clock reproducing circuit is used to generate the data reproducing clock, since the rotation of the disc is not constant, variation in the frequency at the servo area is problematical. If the servo area is long, since the voltage controlled oscillator 71 at the servo area operates in itself, the rotation of the disc varies while the servo area is being reproduced, so that, when reproduction of the next data begins, the phase causes a jump and there is a fear that the jitter may cause an error in an initial portion of the next segment. It is therefore preferable to make the servo area smaller in length as much as possible. In consideration of the stability of rotation of the present disc, the servo area must be less than 4 to 5 bits.

Next, it will be described that the recording format of the third invention is optimum from the view point of tracking servo and signal processing.

1) It is desirable that the data area is a byte unit from the viewpoint of signal processing. Accordingly, it is preferred that all the units be 8-bit units, but if that would be difficult, then it is desirable to use 4-bit unit being the divisor thereof and a multiple of 2.

2) It is desirable that a servo area length is as small as possible from the aspect of data recording, but it is required to keep it under 4 to 5 bits even when the largest in length.

3) It is desirable that the number of wobbled pits per one rotation is 3000 or more from the viewpoint of tracking servo.

4) The track address information must be obtained by 300 or more per one rotation.

5) It is desirable that the data recording efficiency does not largely deteriorate more than the conventional example. Collectively, the optical disc having the realizable track format is obtained only by the present invention.

When the above example is applied to a disc of diameter of 130 mm, a parameter is as follows: the number of sectors per one circle: 32 sectors, the number of track address data portions per one circle: 512, the number of wobbled pits per one circle: 5504, and a servo area length: 4 bits.

The above example is applicable also to a disc of a smaller diameter of 90 mm. The parameters for the disc of diameter of 90 mm are as follows: The number of sectors per one circle: 20, the number of track address data portions per one circle: 320, the number of wobbled pits per one circle: 3340, and a servo area length: 4 bits. Accordingly, the disc of 90 mm in diameter of course is applicable to the present invention.

In addition, a magneto-optical disc is explained in this embodiment. However, the present invention of course may be applicable to the reproducing of exclusive data which records data by the phase pit and also to a write-once type optical disc, such as a punching system.

As seen from the above, the present invention is reduced in servo area length to 0.5 byte so as to enable the self-clock modulation code to be adopted in spite of the sampled servo system. Since the number of wobbled pits per one circle exceeds 3000, the band of tracking servo can be wide to enable access control of track computing system.

Next, explanation will be given on an embodiment of the fourth invention with reference to the drawing. FIG. 20 shows an example of a recording format of an optical disc of the fourth invention. The data is recorded in sector construction in the same way as the conventional example. In FIG. 20, reference numeral 1 designates a data format in one track, the interior of which is partitioned into segments 2 each of 4.5 bytes, and each segment 2 comprises a data area 9 of 4 bytes and a servo area 6 of 0.5 byte for the wobbled pit. In the servo areas 4, 4 . . . are recorded one by one the wobbled pits 5, 6 and 8, the wobbled pits 5 and 8 shifting rightwardly from the track center to an extent of about ¼ size of pit when viewed in the forward direction of the light beam, and the wobbled pit 6 shifting leftwardly from the track center to an extent of about ¼ size of pit when viewed in the forward direction of the light beam. Even in the signal format in the fourth invention, the tracking servo is performable in same way as the conventional example. In the conventional example, a new tracking error signal is obtained at every 16 bytes. However in the signal format shown in FIG. 20 there is obtained a new tracking error signal, thereby enabling the tracking servo zone to be increased four times. Reference numeral 7 designates a header provided in the track 1, in which the track address data portion has a length of 4.5 bytes as same as the segment portion, and has a servo area 4 and data area, which are all recorded by the prepit, and codes corresponding to the track addresses are recorded. The data area in the segment in continuation of the header are capable of recording and reproducing, the head segment recording a predetermined pattern 3. The optical disc of this signal format is used to enable the phase shift of the rec-rep CK and reproduced detected signal to be corrected by circuit processing during the reproducing.

Next, a modified embodiment of the fourth invention will be described. FIG. 21 is a block diagram showing a modified embodiment of the signal format of the optical disc of the fourth invention. The data is recorded by the sector construction in the same way as the conventional example. In FIG. 21, reference numeral 1 designates a data format in one track, which is partitioned into segments 2 each of 5 bytes, each segment including data 9 of 4 bytes and a gap 10 of 1 byte. In the gap 10 are recorded two pits of wobbled pit 4 and not-wobbled clock pit 5, the wobbled pit being different in the wobbling direction at each segment. The wobbled pits 4 and 8 shift rightwardly from the track center to an extent of about ¼ size of pit when viewed in the forward direction of the light beam. The wobbled pit 6 shifts leftwardly from the track center by about ¼ size of pit when viewed in the forward direction of the light beam. Also, in the signal format, the tracking servo is performable in the same way as the conventional example. In the conventional example, a new tracking error signal is obtained at every 16 bytes, but in the signal format shown in FIG. 21, a new tracking error signal is obtained at every 5 bytes, thereby enabling the tracking servo zone to be increased four times. The phase jitter at PLL for forming the rec-rep CK is stabilized by increasing the phase comparison signal. Reference numeral 7 designates a header provided in the track 1 and has at the track address data area a length of 5 bytes as does the segment and in the internal construction a servo area 10 and a data area, which are all recorded by the prepits, the data area being recorded therein codes corresponding to the track addresses. The data area in the segment in continuation of the header is in the area capable of recording and reproducing, the head segment of which records a predetermined pattern. The optical disc of this signal format is used to enable the phase shift between the rec-rep CK and the reproducing detected signal to be corrected by circuit processing during the reproducing.

Figure 7:
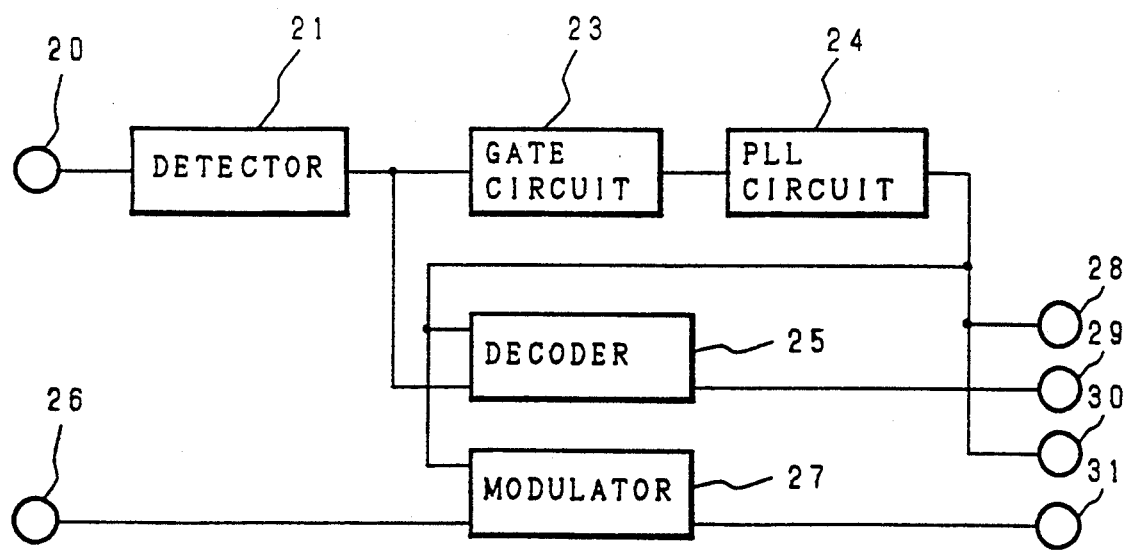
FIG. 7 is a block diagram of the conventional recording-reproducing data forming circuit, FIG. 8, consisting of (a)–(l), is a waveform chart explanatory of operation of the circuit shown in FIG. 7, FIGS. 9(a)–9(e) are illustrations of decoding phases of a recording-reproducing clock and detected signal in the conventional example.
Figure 23:
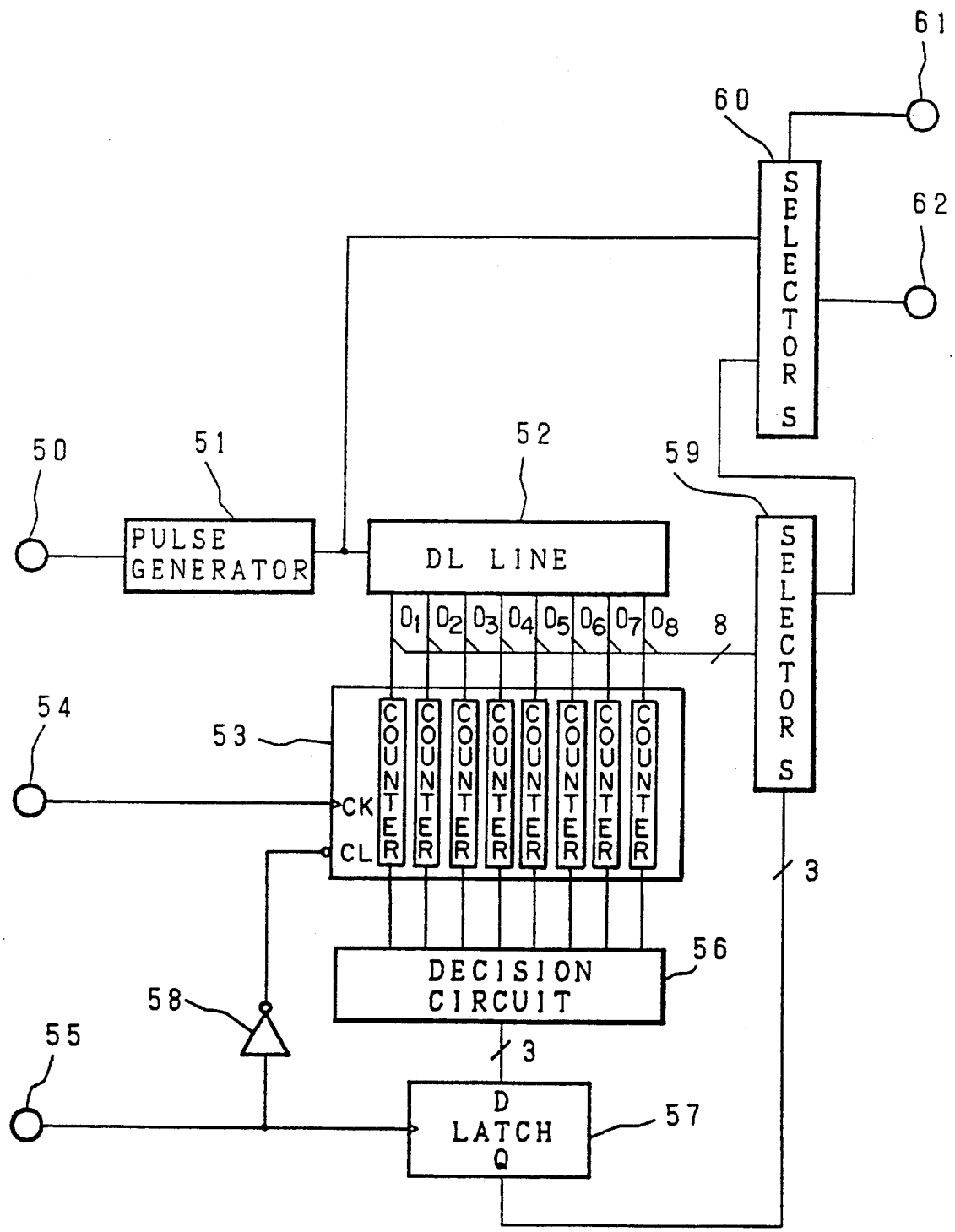
FIG. 23 is a circuit diagram showing the construction of a phase corrector, and FIG. 24, consisting of (a)-(k), is an illustration of operation of the phase corrector shown in FIG. 23.

Next, a reproducing signal demodulating method in the fifth invention, which corrects the phase shift of the reproducing detected signal recorded-reproduced by the signal format recorded in the optical disc in the fourth invention, will be described with reference to a concrete example. FIG. 22 is a block diagram of a recording-reproducing data forming circuit using the method of demodulating the reproducing signal of signal format in the fourth invention. The circuit is different from the conventional circuit shown in FIG. 7 in that the output signal of a reproducing detector 21 is inputted to a phase compensator 22 for correcting the demodulation phase shift of the recording reproducing CK and reproducing detected signal prior to being inputted to the demodulator 25, the phase shift being thereby corrected. FIG. 23 is a structural view of the phase corrector, and FIG. 24 is an illustration therefor. In FIG. 23, the reproduced detected signal is inputted to a terminal 50 and becomes a constant pulse width by a pulse generator 51 of constant width and is inputted to a delay line (DL line) 52 with taps for a delay quantity $\tau$ between the smallest taps, thereby obtaining signals 01 through 08 delayed each by $\tau$. In FIG. 24, the signal (b) of the data portion and gap portion at each segment with respect to the signal format (a) in the track has been well-known of its timing position by the rec-rep CK (f), and a timing signal (c) showing the preformat area and the timing signal (d) of the predetermined pattern area following the header are inputted to the terminals 61 and 55 respectively. The recorded signal in the predetermined pattern area is assumed to be a pattern of, for example, logical "001001 ... 00100" such as (e). During the reproducing, the demodulation RZ signal is the predetermined pattern area has already been known of its recording pattern, so that a recording pattern (g) of the same phase as the recording signal is inputted to a terminal 54. In FIG. 23, the respective delayed reproduced detected signals 01 through 08 are inputted into a counter 53 whose clock and clear terminals are on the same line. For example, a synchronous system counter, such as SN74163N, is used as the counter and the respective signals 01 through 08 are assumed to be connected to ET and EP terminals. This counter, when the clock signal (g) is inputted, counts up only when the signals 01 through 08 are at the high level. The input to the CL terminal (an inverted signal to (d)) is at a low level at the area other than the predetermined pattern area. The clock signal (g) operates to reset the counter other than the predetermined pattern area, so that a counter on the output line where the respective delay line outputs (j) through (k) coincide in phase with the clock signal g, operates so as to have the maximum count value. A decision circuit 56 is a logic circuit to decide an output value of, for example, a maximum count input lines 01 through 08, of each counter, and outputs 3-bit code showing its input line. The decision codes are latched by a latch circuit 57 when the predetermined pattern ends and outputs through a selector 59 a DL line output signal of a minimum phase error. On the other hand, the reproduce detected signal of the prepit area passes such correction circuit to cause a reverse shift from the normal phase, whereby a selector 60 uses a switching signal (c) and outputs an input signal to the DL line as the detected signal. As seen from the above, the reproducing signal recorded in the fixing pattern region can be corrected of its phase and rec-rep CK by the phase corrector. The delay line with taps is assumed to be equal to 5nsec, so that a phase correction error of 5Mbps, (2-7) RLLC code is $\pm$5nsec and can be sufficiently reduced with respect to a decoding windown ($=\pm$50nsec). The predetermined pattern in the signal format of the invention may be arbitrary. Also, it is possible to delay the detected signal by using a high frequency clock signal or the like instead of the delay line. Also, the decision logic at the decision circuit 56 shown in FIG. 23 is subjected to statistical processing to thereby enable the decision capacity to be improved.

As seen from the above, the signal format of the optical disc of the fourth invention is used to decode the reproducing signal in the fifth invention, whereby a phase shift of the reproducing detected signal and recording-reproducing clock generated from the preformatted clock pit, which is problematical when the photomagnetic recording, RZ/NRZI recording and magnetic field modulation overwrite recording are carries out on the sampled servo system optical disc, is correctable by circuit processing, thereby enabling an improvement in capacity and transfer rate of the optical disc driving apparatus. The hardware to attain such effect is constituted by the logic circuit, the large scale integration is easy, and a practical value is high.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A signal decoding method for signals recorded on an optical disc, the optical disk having a header segment including a header servo area having at least one clock pit containing a clock signal and a track discrimination area having preformatted pits containing a track address signal, the optical disk further having a plurality of data segments each having a data servo area and a data area, each said data area including a plurality of recording pits containing data of the recorded signals, said method comprising;

reproducing signals from said recording pits and said preformatted pits to produce reproduced signals; and decoding said reproduced signals obtained from said recording pits and said preformatted pits through a plurality of separate delay circuits each having a different delay time.

2. A signal decoding method as set forth in claim 1, further comprising, prior to said decoding step, reproducing the clock signal from said clock pits, wherein the clock signal is substantially in phase with the reproduced signals.

3. A signal decoding method as set forth in claim 2, wherein said decoding step comprises producing, from said reproduced signals, a plurality of delay signals each having a respective different delay time, and utilizing a predetermined range of decoded phases of said delay signals and said clock signal to select said delay signal to be decoded.

4. A signal decoding method as set forth in claim 1, wherein each of said data servo areas of said plurality of data segments includes at least one clock pit also containing the clock signal and wherein said method further comprises, prior to said decoding step, reproducing the clock signal from said clock pits, wherein the clock signal is substantially in phase with the reproduced signals.

5. A signal decoding method as set forth in claim 4, wherein said decoding step comprises producing, from said reproduced signals, a plurality of delay signals each having a respective different delay time, and utilizing a predetermined range of decoded phases of said delay signals and said clock signal to select said delay signal to be decoded.

6. Apparatus for decoding a signal reproduced from an optical disc including a predetermined pattern portion, said apparatus comprising:
   a detector, connected to receive the reproduced signal, for producing a first detection signal indicative of presence of a pit tip on the optical disk;
   a gate circuit, receiving the first detection signal, for determining whether the detected pit is a clock pit and generating a second detection signal indicative thereof;
   a phase-locked loop, receiving the second detection signal, for producing a clock signal from the detected clock pit;
   a phase compensator, receiving the first detection signal, for producing a correction signal for correcting the demodulation phase shift of the clock signal and the reproduced signal; and
   a decoder, receiving the correction signal and the clock signal, for producing a decoded data signal.

7. Apparatus as recited in claim 6 wherein said phase compensator comprises:
   a pulse generator, connected to receive the reproduced signal, for producing a pulse signal of constant pulse width;
   a multiphase delay line, connected to said pulse generator to receive the pulse signal, for producing a plurality of delayed signals successively delayed by a constant delay;
   a like plurality of counters each clocked by the clock signal and receiving from said delay line a respective one of the delayed signals, for incrementing only when each of the plurality of delayed signals is at a predetermined logic level, said plurality of counters each having a clear input receiving a first timing signal indicative of presence of the predetermined pattern portion of the optical disc, said plurality of counters each producing a respective count signal;
   a decision circuit, receiving the plurality of count signals produced by said plurality of counters, for producing a decision code signal indicative of the respective states of said count signals during each period of said clock signal;
   a latch, controlled by an inverse of the first timing signal, for latching the decision code signal produced by said decision circuit while a data portion of the optical disc is being read and for producing a latched decision code signal;
   a first selector, responsive to the plurality of delayed signals and the latched decision code signal, for producing an output signal; and
   a second selector, responsive to the output signal, the pulse signal and a second timing signal, for producing the detected signal.

* * * * *